US012075373B2

(12) United States Patent
Luo et al.

(10) Patent No.: US 12,075,373 B2
(45) Date of Patent: Aug. 27, 2024

(54) KEEP-ALIVE SIGNAL FOR NETWORK ENERGY SAVING

(71) Applicant: QUALCOMM Incorporated, San Diego, CA (US)

(72) Inventors: Jianghong Luo, Skillman, NJ (US); Navid Abedini, Basking Ridge, NJ (US); Tao Luo, San Diego, CA (US); Junyi Li, Fairless Hills, PA (US); Wanshi Chen, San Diego, CA (US); Naeem Akl, Somerville, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/455,320

(22) Filed: Nov. 17, 2021

(65) Prior Publication Data

US 2022/0400451 A1 Dec. 15, 2022

Related U.S. Application Data

(60) Provisional application No. 63/203,035, filed on Jul. 6, 2021, provisional application No. 63/210,266, filed on Jun. 14, 2021.

(51) Int. Cl.
*H04W 56/00* (2009.01)
*H04W 24/08* (2009.01)
*H04W 76/25* (2018.01)

(52) U.S. Cl.
CPC ......... *H04W 56/001* (2013.01); *H04W 24/08* (2013.01); *H04W 76/25* (2018.02)

(58) Field of Classification Search
CPC .... H04W 56/001; H04W 76/25; H04W 24/08
USPC .......................................................... 370/503
See application file for complete search history.

(56) References Cited

U.S. PATENT DOCUMENTS

| 10,911,134 | B1* | 2/2021 | Choquette | H04W 28/06 |
| 2012/0331087 | A1* | 12/2012 | Luna | H04W 4/18 |
| | | | | 709/224 |
| 2020/0008247 | A1* | 1/2020 | Kwak | H04B 7/0695 |
| 2020/0037248 | A1 | 1/2020 | Zhou et al. | |
| 2020/0260304 | A1* | 8/2020 | Zhou | H04W 72/23 |
| 2022/0210675 | A1* | 6/2022 | Cui | H04W 36/0069 |
| 2022/0312386 | A1* | 9/2022 | Sun | H04B 7/0408 |
| 2022/0361276 | A1* | 11/2022 | Jeon | H04W 72/23 |

OTHER PUBLICATIONS

International Search Report and Written Opinion—PCT/US2022/072747—ISA/EPO—Oct. 5, 2022.

* cited by examiner

*Primary Examiner* — Sai Ming Chan
(74) *Attorney, Agent, or Firm* — Harrity & Harrity, LLP

(57) ABSTRACT

Various aspects of the present disclosure generally relate to wireless communication. In some aspects, a base station may transmit a keep-alive signal that indicates a presence of a cell in an energy saving mode. The base station may transmit a synchronization signal block (SSB) burst set based at least in part on the keep-alive signal. Numerous other aspects are described.

30 Claims, 11 Drawing Sheets

KEEP-ALIVE SIGNAL FOR NETWORK ENERGY SAVING

CROSS-REFERENCE TO RELATED APPLICATION

This Patent application claims priority to U.S. Provisional Patent Application No. 63/210,266, filed on Jun. 14, 2021, entitled "KEEP-ALIVE SIGNAL FOR NETWORK ENERGY SAVING," and assigned to the assignee hereof, and U.S. Provisional Patent Application No. 63/203,035, filed on Jul. 6, 2021, entitled "KEEP-ALIVE SIGNAL FOR NETWORK ENERGY SAVING," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for keep-alive signaling for network energy saving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UNITS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a base station for wireless communication. The base station may include a memory and one or more processors coupled to the memory. The one or more processors may be configured to transmit a keep-alive signal that indicates a presence of a cell in an energy saving mode. The one or more processors may be configured to transmit a synchronization signal block (SSB) burst set based at least in part on the keep-alive signal.

Some aspects described herein relate to a user equipment (UE) for wireless communication. The user equipment may include a memory and one or more processors coupled to the memory. The one or more processors may be configured to receive, from a base station, a keep-alive signal that indicates a presence of a cell in an energy saving mode. The one or more processors may be configured to receive, from the base station, an SSB burst set based at least in part on the keep-alive signal.

Some aspects described herein relate to a method of wireless communication performed by a base station. The method may include transmitting a keep-alive signal that indicates a presence of a cell in an energy saving mode. The method may include transmitting an SSB burst set based at least in part on the keep-alive signal.

Some aspects described herein relate to a method of wireless communication performed by a UE. The method may include receiving, from a base station, a keep-alive signal that indicates a presence of a cell in an energy saving mode. The method may include receiving, from the base station, an SSB burst set based at least in part on the keep-alive signal.

Some aspects described herein relate to a non-transitory computer-readable medium that stores a set of instructions for wireless communication by a base station. The set of instructions, when executed by one or more processors of the base station, may cause the base station to transmit a keep-alive signal that indicates a presence of a cell in an energy saving mode. The set of instructions, when executed by one or more processors of the base station, may cause the base station to transmit an SSB burst set based at least in part on the keep-alive signal.

Some aspects described herein relate to a non-transitory computer-readable medium that stores a set of instructions for wireless communication by a UE. The set of instructions, when executed by one or more processors of the UE, may cause the UE to receive, from a base station, a keep-alive signal that indicates a presence of a cell in an energy saving mode. The set of instructions, when executed by one or more processors of the UE, may cause the UE to receive, from the base station, an SSB burst set based at least in part on the keep-alive signal.

Some aspects described herein relate to an apparatus for wireless communication. The apparatus may include means for transmitting a keep-alive signal that indicates a presence of a cell in an energy saving mode. The apparatus may include means for transmitting an SSB burst set based at least in part on the keep-alive signal.

Some aspects described herein relate to an apparatus for wireless communication. The apparatus may include means for receiving, from a base station, a keep-alive signal that indicates a presence of a cell in an energy saving mode. The apparatus may include means for receiving, from the base station, an SSB burst set based at least in part on the keep-alive signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
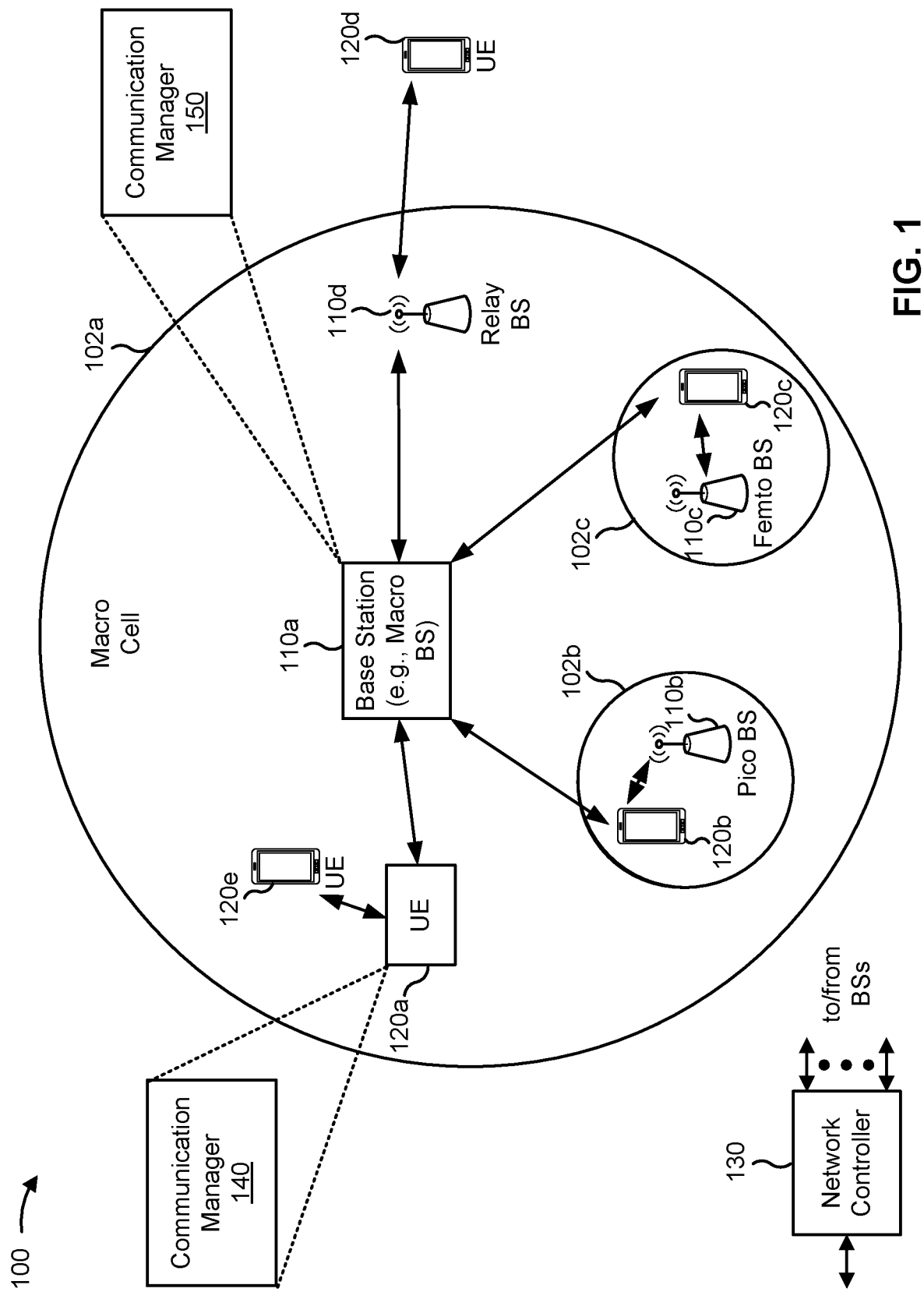
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a keep-alive signal that indicates a presence of a cell in an energy saving mode; and receive, from the base station, a synchronization signal block (SSB) burst set based at least in part on the keep-alive signal. Additionally, or alternatively, the communication manager 140 may perform one or more other operations described herein.

In some aspects, the base station 110 may include a communication manager 150. As described in more detail elsewhere herein, the communication manager 150 may transmit a keep-alive signal that indicates a presence of a cell in an energy saving mode; and transmit an SSB burst set based at least in part on the keep-alive signal. Additionally, or alternatively, the communication manager 150 may perform one or more other operations described herein.

As indicated above, FIG. 1 is provided as an example. Other examples may differ from what is described with regard to FIG. 1.

Figure 2:
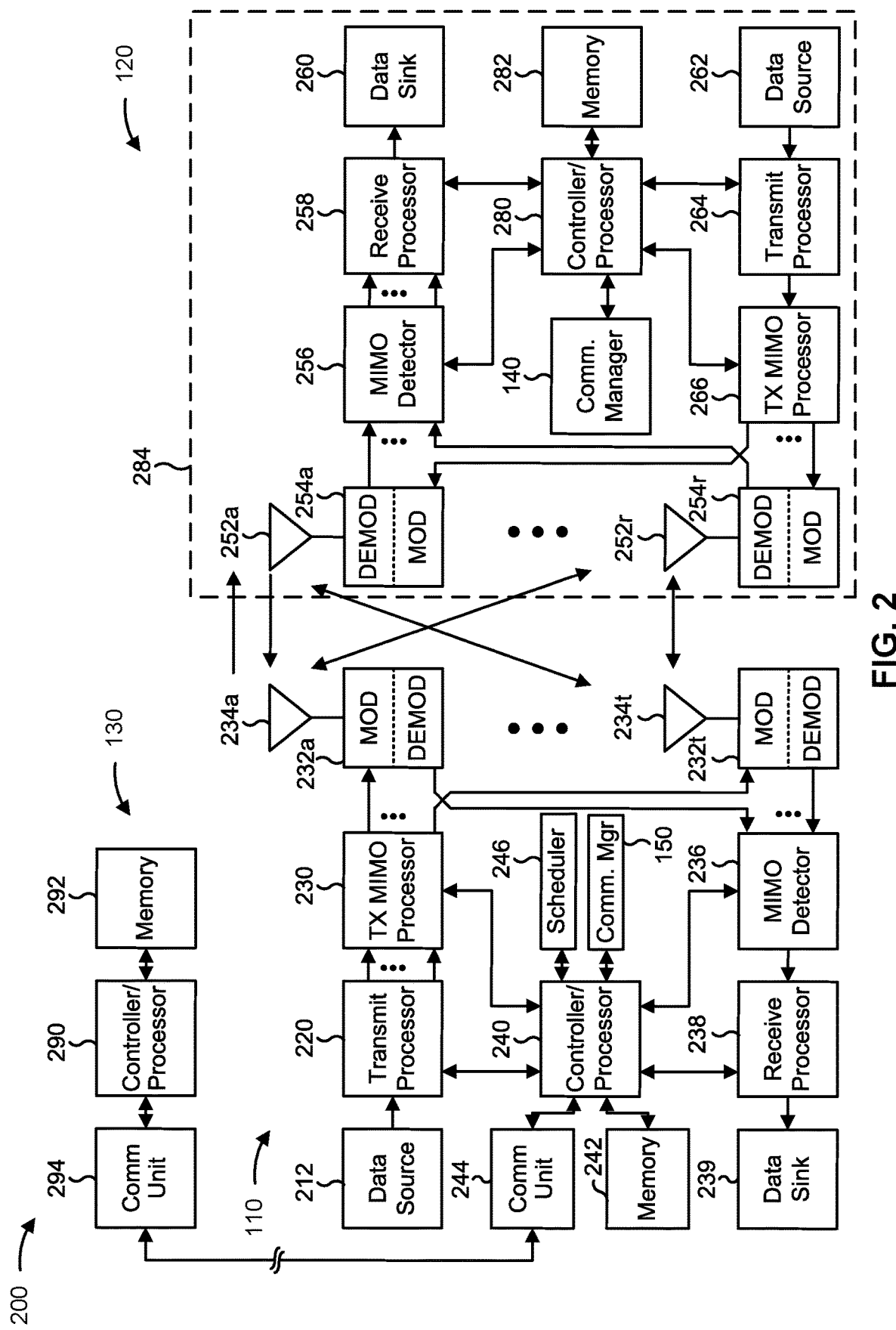
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with keep-alive signaling for network energy saving, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the base station 110 includes means for transmitting a keep-alive signal that indicates a presence of a cell in an energy saving mode; and/or means for transmitting an SSB burst set based at least in part on the keep-alive signal. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving, from a base station, a keep-alive signal that indicates a presence of a cell in an energy saving mode; and/or means for receiving, from the base station, an SSB burst set based at least in part on the keep-alive signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
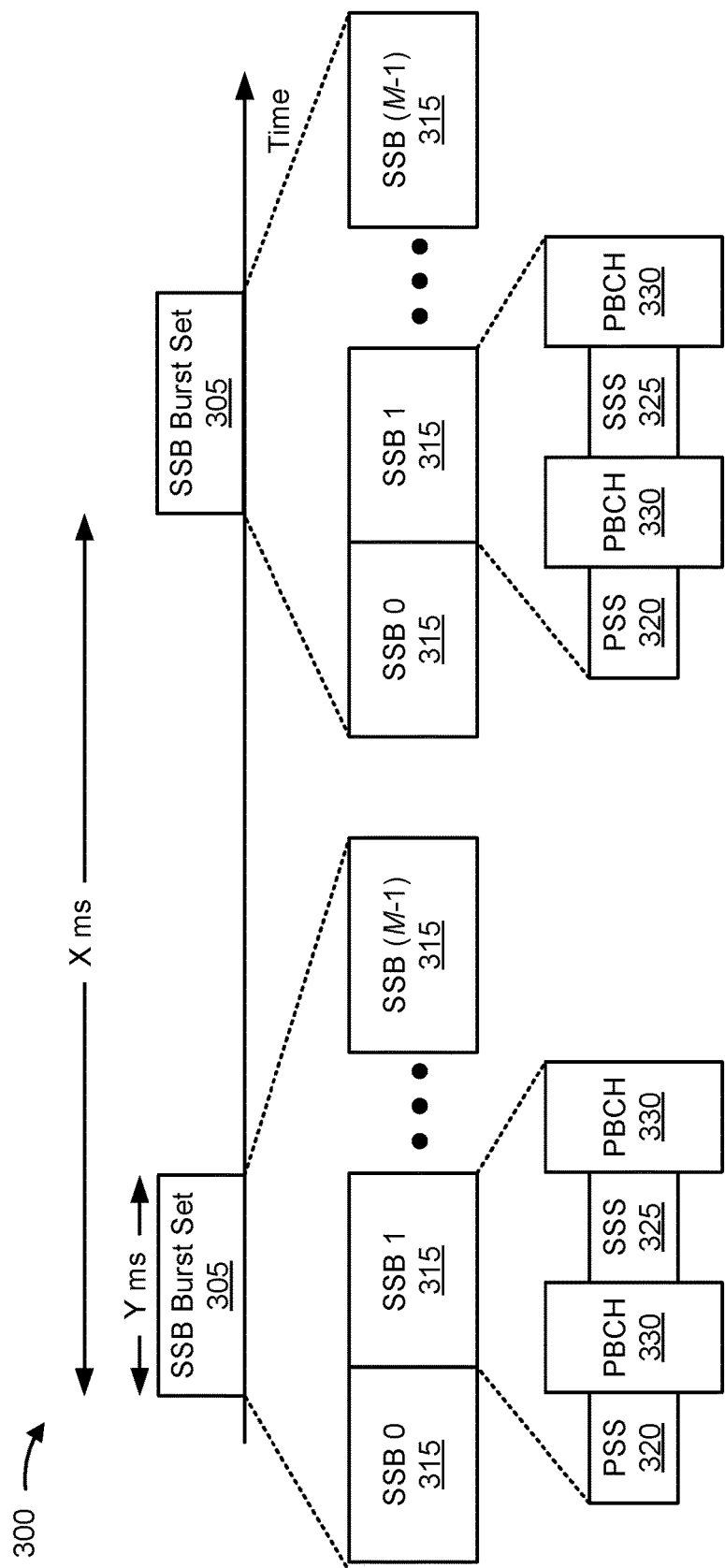
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SSB burst set 305. As further shown, each SSB burst set 305 may include one or more SSBs 315, shown as SSB 0 through SSB M−1, where M is a maximum number of SSBs 315 that can be carried by an SSB burst set 305. In some aspects, different SSBs 315 may be beam-formed differently (e.g., transmitted using different beams), and may be used for cell search, cell acquisition, beam management, and/or beam selection (e.g., as part of an initial network access procedure). An SSB burst set 305 may be periodically transmitted by a wireless node (e.g., base station 110), such as every X milliseconds (ms), as shown in FIG. 3. For example, the SSB burst set 305 may have a periodicity of 20 ms for initial cell search. In some examples, an SSB burst set 305 may have a fixed or dynamic duration, shown as Y milliseconds in FIG. 3. For example, the duration Y ms of an SSB burst set 305 is confined within a window of 5 ms according to the 3GPP specification. In some cases, an SS burst set 305 may be referred to as a discovery reference signal (DRS) transmission window or an SSB measurement time configuration (SMTC) window.

In some examples, an SSB 315 may include resources that carry a PSS 320, an SSS 325, and/or a physical broadcast channel (PBCH) 330. In some examples, multiple SSBs 315 are included in an SSB burst set 305 (e.g., with transmission on different beams), and the PSS 320, the SSS 325, and/or the PBCH 330 may be the same across each SSB 315 of the SSB burst set 305. In some examples, a single SSB 315 may be included in an SSB burst set 305. In some examples, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two or more symbols). For example, in some cases, a first symbol of the SSB 315 may carry the PSS 320, a second symbol of the SSB 315 may carry the PBCH 330, a third signal of the SSB 315 may carry the SSS 325 and the PBCH 330, and a fourth signal of the SSB 315 may carry the PBCH 330. The PSS 320 and SSS 325 may carry a physical cell identifier (PCI). For example, in 5G/NR there may be 1008 possible PCI values. In some examples, the PSS 320 may carry a sequence (e.g., an m-sequence of length 127) selected from three different sequences corresponding to three different groups of 336 PCI values. In some examples, the SSS 325 may carry a sequence selected from 336 different sequences corresponding to different PCI values. The PBCH may carry a master information block (MIB) that provides system information for initial access (e.g., how to receive remaining minimum system information (RMSI), as well as timing information including an SSB index. In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SSB burst set 305 may be transmitted in consecutive radio resources (e.g., consecutive symbols) during one or more slots. Additionally, or alternatively, one or more SSBs 315 of the SSB burst set 305 may be transmitted in non-consecutive radio resources.

In some aspects, the SSB sets 305 may have a burst period, and the SSBs 315 of the SSB burst set 305 may be transmitted by a wireless node (e.g., base station 110) according to the burst period. In some examples, an SSB burst set 305 may include multiple repetitions of SSB bursts within its periodicity.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

It is desirable to conserve energy in a wireless network, for example by reducing power consumption of network nodes (e.g., base stations and/or cells). In some cases, a cell that is not serving any UEs may enter an energy saving mode. In some examples, while a cell is in an energy saving mode, a base station associated with that cell may transmit SSBs and monitor a RACH only for cell discovery purposes. This may result in unnecessary network energy consumption due to transmitting the SSBs with a shorter periodicity than needed while in the energy saving mode. In some examples, a cell in an energy saving mode may be turned off such that the base station associated with that cell does not transmit SSBs for the cell. In this case, the base station associated with the cell in the energy saving mode may require wake-up signaling from a central network entity to resume transmitted SSBs for the cell. This may result in reduced network energy consumption as compared with transmitting SSBs and monitoring the RACH for cell discovery purposes, but may result in increased connection latency when a UE discovers and attempts to connect to the cell.

Some techniques and apparatuses described herein may enable a base station to transmit a keep-alive signal that indicates a presence of a cell in an energy saving mode and transmit an SSB burst set based at least in part on the keep-alive signal. A UE may receive the keep-alive signal and receive the SSB burst set based at least in part on the keep-alive signal. In some aspects, the base station may transmit the SSB burst set with a periodicity that is based at least in part on a periodicity of the keep-alive signal, and the UE may monitor one or more candidate occasions for the SSB burst set determined based at least in part on the periodicity of the keep-alive signal. In some aspects, the UE may transmit an uplink triggering signal to the base station based at least in part on receiving the keep-alive signal, and the base station may transmit the SSB burst set based at least in part on receiving the uplink triggering signal from the UE. As a result, the base station may reduce SSB transmissions, resulting in reduced power consumption, and the connection latency may be reduced as compared with turning off the cell and requiring wake-up signaling from a central network entity. Accordingly, the techniques and apparatuses described herein may result in an improved tradeoff between network energy savings and connection latency for a cell in an energy saving mode.

Figure 4:
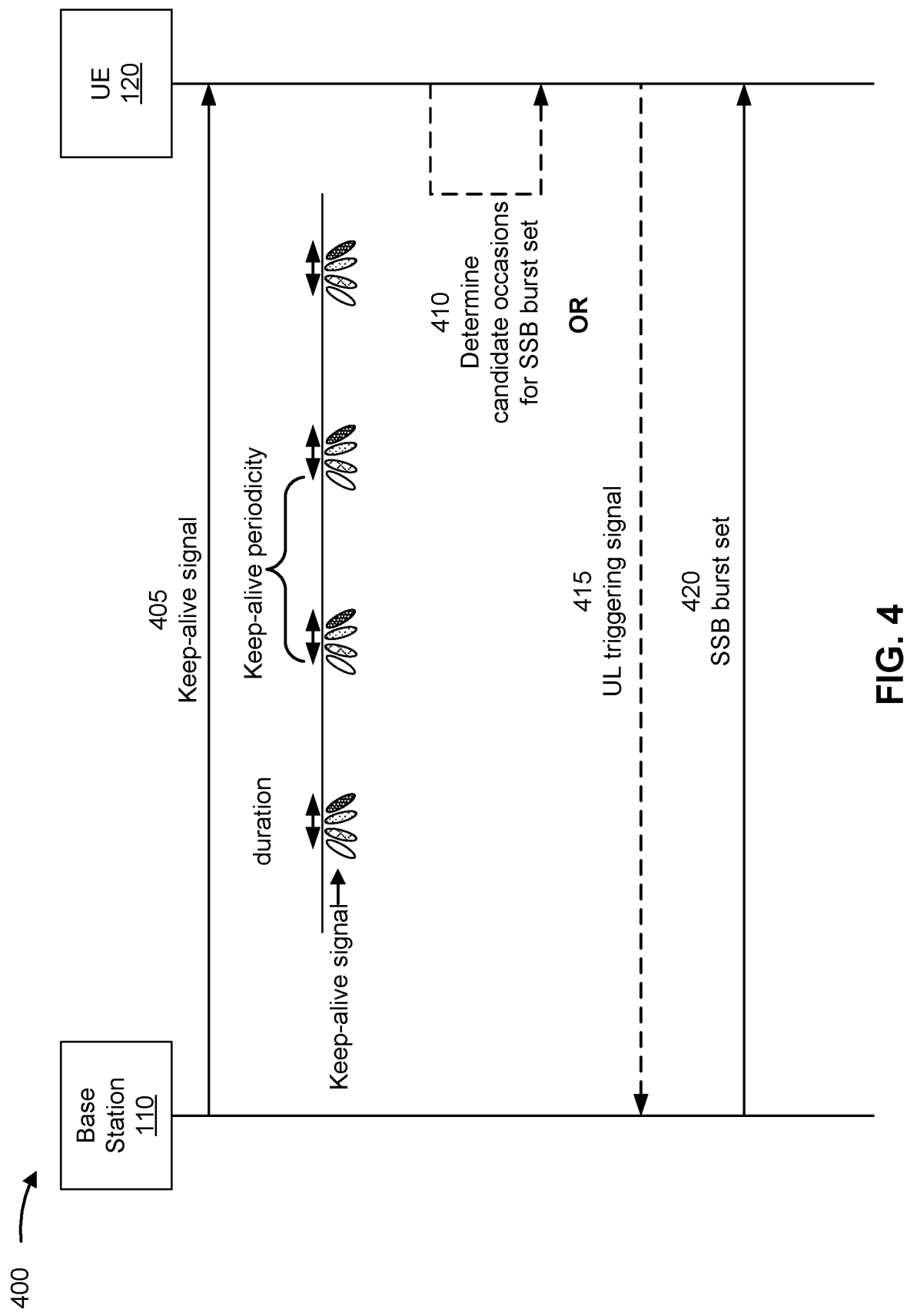
FIGS. 4-7 are diagrams illustrating examples associated with keep-alive signaling for network energy saving, in accordance with the present disclosure.

FIG. 4 is a diagram illustrating an example 400 associated with keep-alive signaling for network energy saving, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit a keep-alive signal that indicates the presence of a cell in an energy saving mode. The base station 110 may periodically broadcast the keep-alive signal while a cell associated with the base station 110 is in the energy saving mode. In some aspects, the base station 110 may begin transmitting the keep-alive signal based at least in part on switching the cell associated with the base station 110 to the energy saving mode. In some aspects, the base station 110 may switch the cell to the energy saving mode in connection with a determination that a number of UEs being served by the cell does not satisfy a threshold. For example, in some aspects, the base station 110 may switch the cell to the energy saving mode in connection with a determination that no UEs are being served by the cell. A cell in the energy saving mode may be referred to as an "energy saving cell."

The keep-alive signal may be a periodic signal that indicates the presence of the energy saving cell. In some aspects, the keep-alive signal may include one or more generation sequences that are configured to indicate the presence of a cell in the energy saving mode. In some aspects, the base station 110 may select the generation sequence(s) for the keep-alive signal from a set of candidate generation sequences that are configured to indicate the presence of a cell in the energy saving mode. A generation sequence is a sequence (e.g., m-sequence, Zadoff-Chu sequence, or gold sequence) used to generate a signal, such as the keep-alive signal. The base station 110, to transmit the keep-alive signal, may map the generation sequence(s) for the keep-alive signal onto a number of subcarriers corresponding to a length of the generation sequence(s).

In some aspects, one or more candidate generation sequences may be defined for the keep-alive signal (e.g., pursuant to a wireless communication standard). In this case, the base station 110 and the UE 120 may store the one or more candidate generation sequences defined for the keep-alive signal. In some aspects, one or more candidate generation sequences for the keep-alive signal may be configured via a broadcast from another cell (e.g., associated with another base station) that is not in the energy saving mode. For example, an always-on cell or compensation cell may broadcast the one or more candidate generation sequences for the keep-alive signal (and/or other parameters for the keep-alive signal) for all cells in the energy saving mode within a geographical area. In some aspects, the number of candidate generation sequences for the keep-alive signal may be much smaller that the number of possible PCIs (e.g., 1008) carried by the PSS/SSS in an SSB.

The keep-alive signal may be characterized by a periodicity (e.g., keep-alive periodicity), duration, and the one or more generation sequences used to generate the keep-alive signal. In some aspects, the periodicity and/or duration may be defined for the keep-alive signal (e.g., pursuant to a wireless communication standard), and stored by the base station 110 and the UE 120. In some aspects, the periodicity and/or duration for the keep-alive signal may be configured by another cell (e.g., associated with another base station) not in the energy saving mode. The periodicity associated with the keep-alive signal may be a time interval between periodic transmissions of the keep-alive signal by the base station 110. The duration of the keep-alive signal may span one or more consecutive symbols. In some aspects, the duration of the keep-alive signal may span multiple consecutive symbols, and the base station 110 may perform beam sweeping by transmitting the keep-alive signal over different beam directions in different symbols of the multiple consecutive symbols. For example, the base station 110 may transmit the keep-alive signal on a first beam in a first symbol, on a second beam in a second symbol, and so on.

In some aspects, the duration of the keep-alive signal may span multiple consecutive symbols, and the keep-alive signal may include the same generation sequence for each of the multiple consecutive symbols. In this case, the UE 120 may acquire and use only the symbol boundary for determining timing (e.g., for monitoring for an SSB set and/or transmitting an uplink triggering signal, as described elsewhere herein). In some aspects, the duration of the keep-alive signal may span multiple consecutive symbols, and the keep-alive signal may include different generation sequences in different symbols of the multiple consecutive symbols. In this case, a mapping may be defined (e.g., in a wireless communication standard) between generation sequences and symbols within a slot. For example, the keep-alive signal may include a first generation sequence mapped to a first symbol, a second generation sequence mapped to a second symbol, and so on. In some aspects, the UE 120 may determine a symbol index based on the generating sequence received by the UE 120, and based at least in part on the symbol index, the UE 120 may acquire and utilize a slot boundary for timing (e.g., for monitoring for an SSB set and/or transmitting an uplink triggering signal, as described elsewhere herein).

In some aspects, the keep-alive signal may be associated with a cell group including one or more energy saving cells. In this case, different cell groups may be differentiated by keep-alive signals with different generation sequences and/or different time offsets at which the keep-alive signals are scheduled. For example, at least one of the generation sequence or the time offset for the keep-alive signal transmitted by the base station 110 may be based at least in part on a cell group associated with one or more cells including the cell associated with the base station 110.

The UE 120 may receive the keep-alive signal transmitted by the base station 110. For example, the UE 120 may detect and receive one or more of the periodic broadcasts of the keep-alive signal from the base station 110. The UE 120 may determine that the cell associated with the base station 110 is in the energy saving mode based at least in part on receiving the keep-alive signal (e.g., based at least in part on receiving the keep-alive signal including a generation sequence associated with an indication that a cell is in the energy saving mode).

As further shown in FIG. 4, and by reference number 410, in some aspects, the UE 120 may determine candidate occasions for an SSB burst set based at least in part on receiving the keep-alive signal from the base station 110. In some aspects, the base station 110 may periodically transmit an SSB burst set with a periodicity that is based at least in part on the periodicity of the keep-alive signal. In this case, the UE 120, in connection with receiving the keep-alive signal from the base station 110, may determine one or more candidate occasions for the SSB burst set and monitor the candidate occasions to attempt to receive the SSB burst set.

In some aspects, the periodicity of the SSB burst set may be an integer multiple of the periodicity of the keep-alive signal. For example, the base station 110 may transmit the SSB burst set with an SSB periodicity of: SSB periodicity=ScalingFactorSSB*Keep-alive periodicity, where ScalingFactorSSB is an integer scaling factor and Keep-alive periodicity is the periodicity of the keep-alive signal. As a result, the base station 110 may transmit the SSB burst set once for every N transmissions of the keep-alive signal, where N is equal to the integer scaling factor (ScalingFactorSSB). The base station 110 may also transmit the SSB burst set with at least a minimum time offset (minOffsetToSSB) between the keep-alive signal (e.g., a closest keep-alive signal transmission to the SSB burst set) and the SSB burst set.

In some aspects, the scaling factor (ScalingFactorSSB) and minimum time offset (minOffsetToSSB) may be parameters associated with the keep-alive signal. For example, the scaling factor (ScalingFactorSSB) and minimum time offset (minOffsetToSSB) parameters for the keep-alive signal may be pre-defined (e.g., in a wireless communication standard) or configured and broadcast by another cell (e.g., by a base station associated with the other cell) that is not in the energy saving mode. Upon receiving the keep-alive signal, the UE 120 may determine at least a symbol boundary associated with the keep-alive signal received by the UE 120, and the UE 120 may determine one or more candidate occasions (e.g., candidate locations in the time domain) for the SSB burst set at respective offsets from the symbol boundary associated with the keep-alive signal. In some aspects, the UE 120 may determine the respective offsets for the one or more candidate occasions for the SSB burst set based at least in part on the periodicity associated with the keep-alive signal (Keep-alive periodicity), the scaling factor (ScalingFactorSSB), and the minimum time offset (minOffsetToSSB). For example, the UE 120 may calculate the respective offsets (offsetToSSB) for the one or more candidate occasions as: offsetToSSB=i*Keep-alive periodicity+minOffsetToSSB, i=0, 1, 2, . . . , ScalingFactorSSB−1. In some aspects, the UE 120 may determine the slot boundary associated with the keep-alive signal based at least in part on a symbol index associated with a symbol-specific generation sequence included in the keep-alive signal received by the UE 120. In this case, the UE 120 may apply the offsets for the candidate occasions for the SSB burst set from the slot boundary associated with the keep-alive signal. The UE 120 may monitor the one or more candidate occasions associated with the offsets determined by the UE 120. In some aspects, the UE 120 may perform Rx beam searching over multiple periodic transmissions of the keep-alive signal to select an Rx beam for monitoring the candidate occasions and receiving the SSB burst set.

As further shown in FIG. 4, and by reference number 415, in some aspects, the UE 120 may transmit an uplink triggering signal to the base station 110 based at least in part on receiving the keep-alive signal. In some aspects, instead of (or in addition to) the base station 110 periodically transmitting the SSB burst set for the cell in the energy saving mode, the base station 110 may be triggered to transmit the SSB burst set by the uplink triggering signal transmitted by the UE 120 in connection with the UE 120 receiving the keep-alive signal. In some aspects, the UE 120 may transmit the uplink triggering signal instead of determining candidate occasions for a periodically transmitted SSB burst set (as described in connection with reference number 410).

In some aspects, a single sequence (e.g., generation sequence) may be defined (e.g., in a wireless communication standard) for the uplink triggering signal to trigger SSB burst set transmission. In some aspects, multiple sequences may be defined for the uplink triggering signal. In this case, the UE 120 may randomly select a sequence for transmitting the uplink triggering signal, from the multiple sequences defined for the uplink triggering signal. The uplink triggering signal may be much simpler than a physical RACH (PRACH) preamble used for initiating a RACH initial access procedure. For example, the number of sequences defined for the uplink triggering signal may be fewer than a number of possible sequences (e.g., 64) defined for the PRACH preamble transmission. Because the uplink triggering signal is transmitted, by the UE 120, while the cell is in the energy saving mode, there may be no or few other UEs within the coverage of the cell at the time the UE 120 transmits the uplink triggering signal. Accordingly, the number of sequences defined for the uplink triggering signal may be much less than the number of possible sequences for the PRACH preamble.

The UE 120 may transmit the uplink triggering signal at a time offset (offsetToULTriggering) with respect to receiving the keep-alive signal. For example, the UE 120 may apply the time offset associated with the uplink triggering signal (offsetToULTriggering) from a symbol boundary associated with the keep-alive signal received by the UE 120 or from a slot boundary associated with the keep-alive signal received by the UE 120. The base station 110 may monitor resources subsequent to the keep-alive signal transmission for the uplink triggering signal from the UE 120. In some aspects, after transmitting each transmission of the keep-alive signal, the base station 110 may monitor an uplink triggering signal occasion offset from the keep-alive signal by the time offset associated with the uplink triggering signal (offsetToULTriggering). For example, a starting symbol of each uplink triggering signal occasion may be offset from a starting symbol of a respective keep-alive signal by the time offset (offsetToULTriggering), and the duration of each uplink triggering signal occasion may be equal to the duration of the keep-alive signal. In some aspects, the offset associated with the uplink triggering (offsetToULTriggering) may be pre-defined (e.g., in a wireless communication standard) or configured and broadcast by another cell (e.g., by a base station associated with the other cell) that is not in the energy saving mode. When the UE 120 transmits the uplink triggering signal to the base station 110, the base station 110 may receive the uplink triggering signal based at least in part on monitoring the uplink triggering signal occasion in which the UE 120 transmits the uplink triggering signal.

As described above, the base station 110 may transmit the keep-alive signal on multiple beams. For example, the base station 110 may transmit the keep-alive signal on different beams (e.g., in different beam directions) on different symbols of the keep-alive signal duration. In some aspects, a respective one or more resources for the uplink triggering signal may be associated with each beam of the multiple beams on which the keep-alive signal is transmitted. For example, the respective one or more resources associated with a beam may include one or more time resources for transmitting the uplink triggering signal, one or more frequency resources for transmitting the uplink triggering signal, and/or one or more code or sequence resources for transmitting the uplink triggering signal. In some aspects, the UE 120 may transmit the uplink triggering signal in a resource associated with the beam on which the UE 120 receives a keep-alive signal (e.g., a resource of the respective one or more resources associated with that beam). For example, the base station 110 may use different generation sequences for the keep-alive signal in different symbols (e.g., on different beams), and the UE 120 may determine a symbol index based on the generation sequence received by the UE 120. In this case, UE 120 may determine a resource (e.g., time resource, frequency resource, and/or code or sequence resource) for transmitting the uplink triggering signal based at least in part on the symbol index.

In some aspects, the UE 120 may transmit the uplink triggering signal in a time resource associated with the beam on which the keep-alive signal is received by the UE 120. For example, the UE 120 may apply the time offset (offsetToULTriggering) with respect to receiving the keep-alive signal, which may cause the UE 120 to transmit the uplink triggering signal at a time resource (e.g., a symbol or slot)

that is associated with the beam on which the keep-alive signal is received by the UE 120. In some aspects, the UE 120 may transmit the uplink triggering signal in a frequency resource associated with the beam on which the keep-alive signal is received by the UE 120. For example, each symbol index may be mapped to one or more frequency resources, and the UE 120 may transmit the uplink triggering signal using a frequency resource associated with the symbol index determined for the keep-alive signal. In some aspects, the UE 120 may transmit the uplink triggering signal in a code or sequence resource associated with the beam on which the keep-alive signal is received by the UE 120. "Code or sequence resource" refers to a code or sequence (e.g., generation sequence) that may be used to transmit the uplink triggering signal. For example, multiple possible sequences may be defined for the uplink triggering signal, with different sequences associated with different beams (e.g., associated with different symbol indexes). In this case, the UE 120 may select the generation sequence for transmitting the uplink triggering signal based at least in part on the beam on which the keep-alive signal is received (e.g., based at least in part on the symbol index determined for the keep-alive signal).

In some aspects, the base station 110 may form a receive beam for receiving the uplink triggering signal based at least in part on the association between the different beams on which the keep-alive signal is transmitted and the respective one or more resources on which the uplink triggering signal may be received by the base station 110. For example, for each beam used to transmit the keep-alive signal, the base station 110 may monitor the one or more resources associated with that beam (e.g., within an uplink triggering signal monitoring occasion) using a receive beam corresponding to that beam (e.g., a receive beam having the same beam direction as the transmit beam used to transmit the keep-alive signal).

As further shown in FIG. 4, and by reference number 420, the base station 110 may transmit an SSB burst set based at least in part on the keep-alive signal. The UE 120 may receive the SSB burst set transmitted by the base station 110. In some aspects, based at least in part on receiving the SSB burst set, the UE 120 may transmit a PRACH preamble to the base station 110 in a RACH occasion associated with an SSB in the SSB burst set to initiate a RACH procedure for initial access to the cell associated with the base station 110. In some aspects, after transmitting the SSB burst set, the base station 110 may monitor RACH occasions associated with the SSBs in the SSB burst set, and may receive a PRACH preamble transmission from the UE 120 in a RACH occasion.

In some aspects, the base station 110 may periodically transmit the SSB burst set with a periodicity that is based at least in part on the periodicity of the keep-alive signal. In this case, the periodic SSB burst set transmissions, by the base station 110, are not triggered by receiving the uplink triggering signal from the UE 120. For example, the base station 110 may periodically transmit the SSB burst set for the cell in the energy saving mode without receiving any indication that the UE 120 or any other UE has detected or received the keep-alive signal. In some aspects, the periodicity of the SSB burst set may be an integer multiple of the periodicity of the keep-alive signal. For example, base station 110 may transmit the SSB burst set with an SSB periodicity of: SSB periodicity=ScalingFactorSSB*Keep-alive periodicity. The base station 110 may also transmit the SSB burst set with at least a minimum time offset (minOffsetToSSB) between the keep-alive signal (e.g., a closest keep-alive signal transmission to the SSB burst set) and the SSB burst set. In some aspects, in a case in which the base station 110 periodically transmits the SSB burst set for the cell in the energy saving mode, the UE 120 may monitor one or more candidate occasions for the SSB burst set and receive the SSB burst set in one of the monitoring occasions. In this case, the candidate occasions for the SSB burst set may be determined as described above in connection with reference number 410. In some aspects, the UE 120 may receive the SSB burst set on an Rx beam selected based at least in part on Rx beam searching performed, by the UE 120, over multiple periodic transmissions of the keep-alive signal.

In some aspects, the base station 110 may transmit the SSB burst set in connection with receiving the uplink triggering signal from the UE 120. In some aspects, for the cell in the energy saving mode, the base station 110 may only transmit the SSB burst set (and perform subsequent monitoring for PRACH preamble transmissions) in connection with receiving the uplink triggering signal from the UE 120. Alternatively, in some aspects, the base station 110 may transmit the SSB burst set in connection with receiving the uplink triggering signal in addition to periodic SSB burst set transmissions by the base station 110. In some aspects, after each transmission of the keep-alive signal, the base station 110 may monitor a respective uplink triggering signal occasion offset from the keep-alive signal by a time offset associated with the uplink triggering signal (offsetToULTriggering). The UE 120 may transmit the uplink triggering signal, as described above in connection with reference number 415, and the base station 110 may receive the uplink triggering signal in one of the uplink triggering signal occasions. The base station 110 may then transmit the SSB burst set based at least in part on receiving the uplink triggering signal from the UE 120.

In a case in which the base station 110 transmits the SSB burst set in connection with receiving the uplink triggering signal, a time offset (offsetToSSB) associated with the SSB burst set may be defined relative to the keep-alive signal or the uplink triggering signal. For example, in some aspects, the base station 110 may transmit the SSB burst set, in connection with receiving the uplink triggering signal, at a time offset (offsetToSSB) with respect to transmitting the keep-alive signal. In some aspects, the base station 110 may transmit the SSB burst set, in connection with receiving the uplink triggering signal, at a time offset (offsetToSSB) with respect to receiving the uplink triggering signal. In some aspects, after transmitting the uplink triggering signal, the UE 120 may monitor an SSB burst set occasion and receive the SSB burst set transmitted by the base station 110 based at least in part on monitoring the SSB burst set occasion. For example, the SSB burst set occasion may be offset from the keep-alive signal by the time offset (offsetToSSB), or the SSB burst set occasion may be offset from the uplink triggering signal by the time offset (offsetToSSB). In some aspects, the offset associated with the SSB burst set (offsetToSSB) may be pre-defined (e.g., in a wireless communication standard) or configured and broadcast by another cell (e.g., by a base station associated with the other cell) that is not in the energy saving mode.

As described above, in some aspects, the UE 120 may transmit the uplink triggering signal in a resource (e.g., time resource, frequency resource, and/or code or sequence resource) that is associated with the beam (e.g., of multiple beams transmitted by the base station 110) on which the UE 120 received the keep-alive signal. In this case, the SSB transmitted by the base station 110 may be based at least in part on the resource (e.g., time resource, frequency resource, and/or code or sequence resource) in which the uplink triggering signal is received by the base station 110. For example, the base station 110 may determine, based at least in part on the resource on which the uplink triggering signal is received, an SSB periodicity, an offset of the SSB burst set (e.g., offsetToSSB), and/or a selection of which SSBs, from a set of possible SSBs (e.g., 64 possible SSBs in FR2) are in the SSB burst set.

In some aspects, the MIB in the SSBs included in the SSB burst set based at least in part on the keep-alive signal (e.g., the SSB burst set transmitted based at least in part on receiving the uplink triggering signal) may include some different information (e.g., a first information set) from information (e.g., a second information set) included in the MIB of other SSBs (e.g., SSBs in an SSB burst set not based at least in part on the keep-alive signal). For example, some information, such as an indication of which SSBs are sent and the SSB index, may be conveyed in the keep-alive signal. In this case, in an SSB associated with the keep-alive signal (e.g., an SSB transmitted based at least in part on receiving the uplink triggering signal), the bit fields in the MIB used to convey the information already conveyed in the keep-alive signal may be reinterpreted or repurposed to convey other information to the UE 120. For example, the bit fields in the MIB for the information already conveyed in the keep-alive signal may be used to convey information such as power saving parameters, time to exit the current power saving mode, and/or a new set of access parameters for idle UEs, among other examples. In this case, in order to avoid confusion for UEs that may not correctly interpret this information, the SSBs in the SSB burst set associated with the keep-alive signal (e.g., the SSB burst set transmitted based at least in part on receiving the uplink triggering signal) may be non-cell-defining SSBs or off-raster SSBs.

As described above, the base station 110 may transmit a keep-alive signal that indicates a presence of a cell in an energy saving mode, and the base station 110 may transmit an SSB burst set based at least in part on the keep-alive signal. The UE 120 may receive the keep-alive signal, and the UE 120 may receive the SSB burst set based at least in part on the keep-alive signal. In some aspects, the base station 110 may transmit the SSB burst set with a periodicity that is based at least in part on a periodicity of the keep-alive signal, and the UE 120 may monitor one or more candidate occasions for the SSB burst set determined based at least in part on the periodicity of the keep-alive signal. In some aspects, the UE 120 may transmit an uplink triggering signal to the base station 110 based at least in part on receiving the keep-alive signal, and the base station 110 may transmit the SSB burst set based at least in part on receiving the uplink triggering signal from the UE 120. As a result, the base station 110 may reduce SSB transmissions for the cell in the energy saving mode, resulting in reduced power consumption, and the connection latency may be reduced as compared with turning off the cell and requiring wake-up signaling from a central network entity. Accordingly, the techniques and apparatuses described herein may result in an improved tradeoff between network energy savings and connection latency for a cell in an energy saving mode.

As indicated above, FIG. 4 is provided as an example. Other examples may differ from what is described with respect to FIG. 4.

Figure 5:
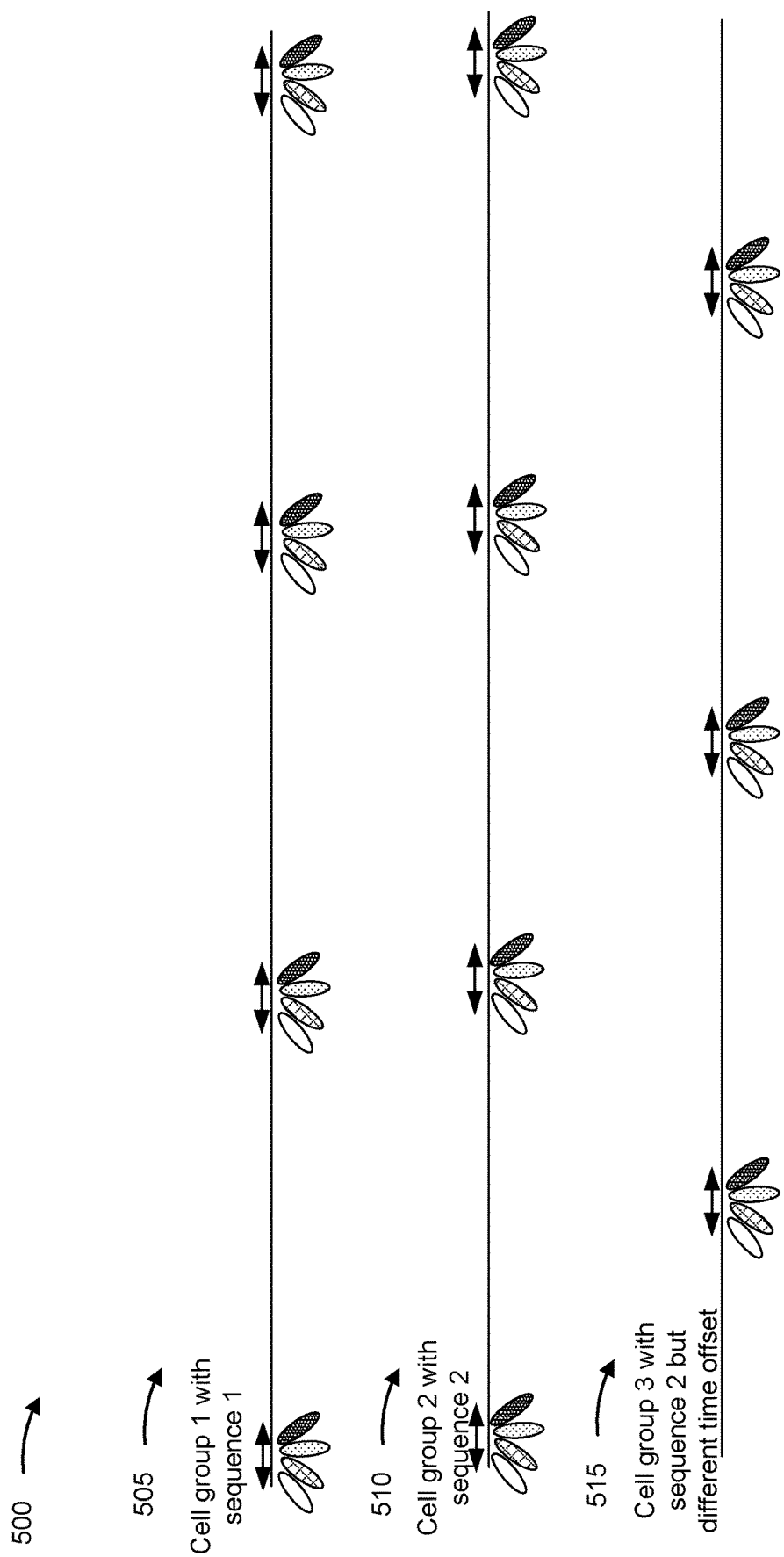

FIG. 5 is a diagram illustrating an example 500 associated with keep-alive signaling for network energy saving, in accordance with the present disclosure. As shown in FIG. 5, example 500 includes keep-alive signals associated with different cell groups. As described above in connection with FIG. 4, in some aspects, a keep-alive signal may be associated with a cell group including one or more energy saving cells. For example, different cell groups may be differentiated by keep-alive signals with different generation sequences and/or different time offsets at which the keep-alive signals are scheduled.

As shown in FIG. 5, and by reference number 505, a keep-alive signal associated with a first cell group ("cell group 1") may include a first generation sequence ("sequence 1"). For example, cell group 1 may include one or more cells in the energy saving mode, and the base stations associated with the cells in cell group 1 may transmit the keep-alive signal associated with cell group 1. As shown by reference number 510, a keep-alive signal associated with a second cell group ("cell group 2") may include a second generation sequence ("sequence 2"). For example, cell group 2 may include one or more cells in the energy saving mode, and the base stations associated with the cells in cell group 2 may transmit the keep-alive signal associated with cell group 2. As shown by reference number 515, a keep-alive signal associated with a third cell group ("cell group 3") may include sequence 2, but may be scheduled with a different time offset with respect to the keep-alive signal associated with cell group 2. For example, cell group 3 may include one or more cells in the energy saving mode, and the base stations associated with the cells in cell group 3 may transmit the keep-alive signal associated with cell group 3.

As indicated above, FIG. 5 is provided as an example. Other examples may differ from what is described with respect to FIG. 5.

Figure 6:
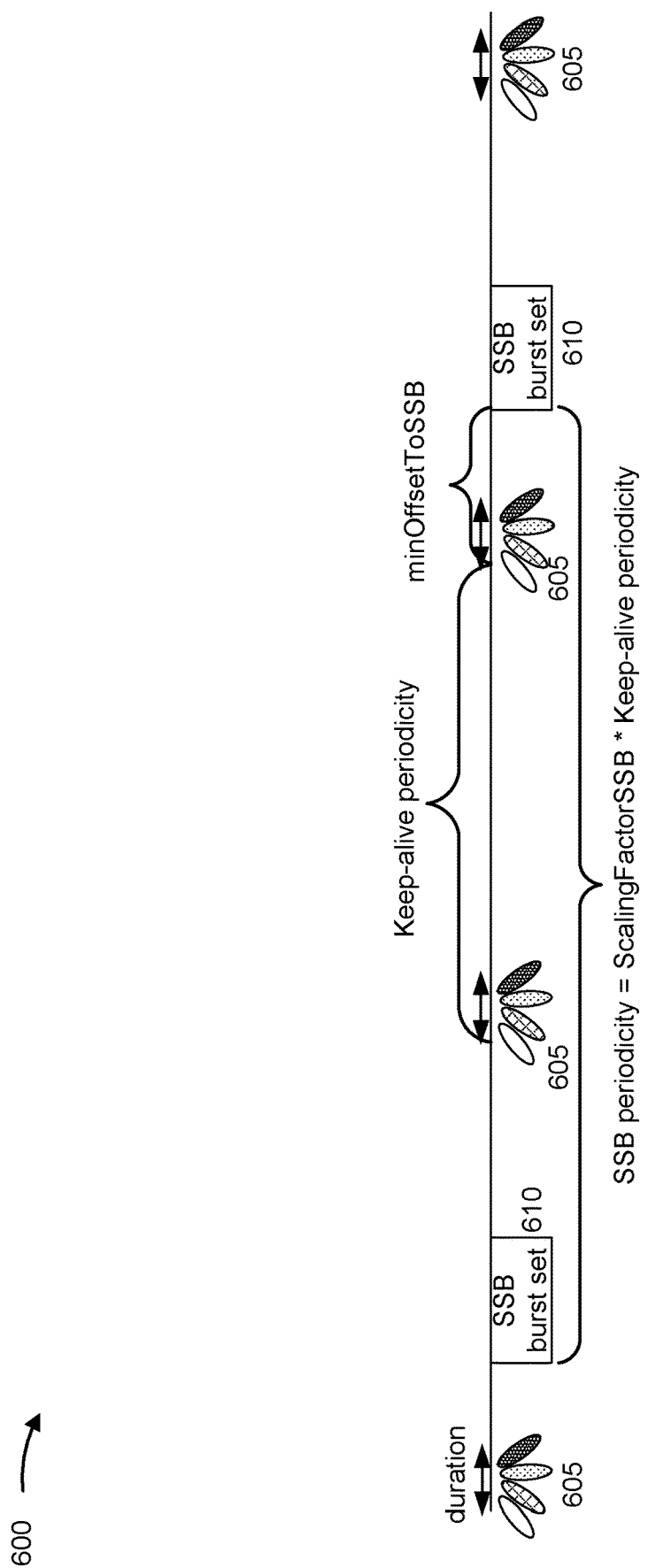

FIG. 6 is a diagram illustrating an example 600 associated with keep-alive signaling for network energy saving, in accordance with the present disclosure. As shown in FIG. 6, example 600 shows an example in which a base station periodically transmits SSB burst sets for a cell in an energy saving mode.

As shown in FIG. 6, a base station may periodically transmit a keep-alive signal 605 that indicates the presence of a cell in an energy saving mode. The keep-alive signal 605 may have a defined duration and may be transmitted with a defined keep-alive periodicity. As further shown in FIG. 6, the base station may periodically transmit an SSB burst set 610 for the cell in the energy saving mode. In some aspects, the base station may periodically transmit the SSB burst set 610 with an SSB periodicity that is based at least in part on the keep-alive periodicity associated with the keep-alive signal. In this case, the SSB periodicity may be an integer multiple of the keep-alive periodicity. For example, as shown in FIG. 6, the SSB periodicity may be determined as: SSB periodicity=ScalingFactorSSB*Keep-alive periodicity, where ScalingFactorSSB is an integer scaling factor. The base station may also transmit the SSB burst set 610 with at least a minimum time offset (minOffsetToSSB) between a closest transmission of the keep-alive signal 605 and the SSB burst set 610.

In some aspects, a UE may detect and receive a transmission of the keep-alive signal 605, and the UE may monitor one or more candidate occasions for the SSB burst set 610 based at least in part on receiving the keep-alive signal 605. In some aspects, the UE may determine the one or more candidate occasions for the SSB burst set 610 based at least in part on the keep-alive periodicity, the scaling factor (ScalingFactorSSB), and the minimum time offset (minOffsetToSSB). For example, the UE may calculate the one or more offsets (offsetToSSB) from the received keep-alive signal as: offsetToSSB=i*Keep-alive periodicity+minOffsetToSSB, i=0, 1, 2, . . . , ScalingFactorSSB−1. In this case, each offset (offsetToSSB) calculated by the UE is an offset between the received keep-alive signal and a respective candidate occasion for the SSB burst set 610. The UE may monitor the one or more candidate occasions associated with the one or more offsets (offsetToSSB) calculated by the UE, and the UE may receive the SSB burst set 610 in one of the monitored candidate occasions.

As indicated above, FIG. 6 is provided as an example. Other examples may differ from what is described with respect to FIG. 6.

Figure 7:
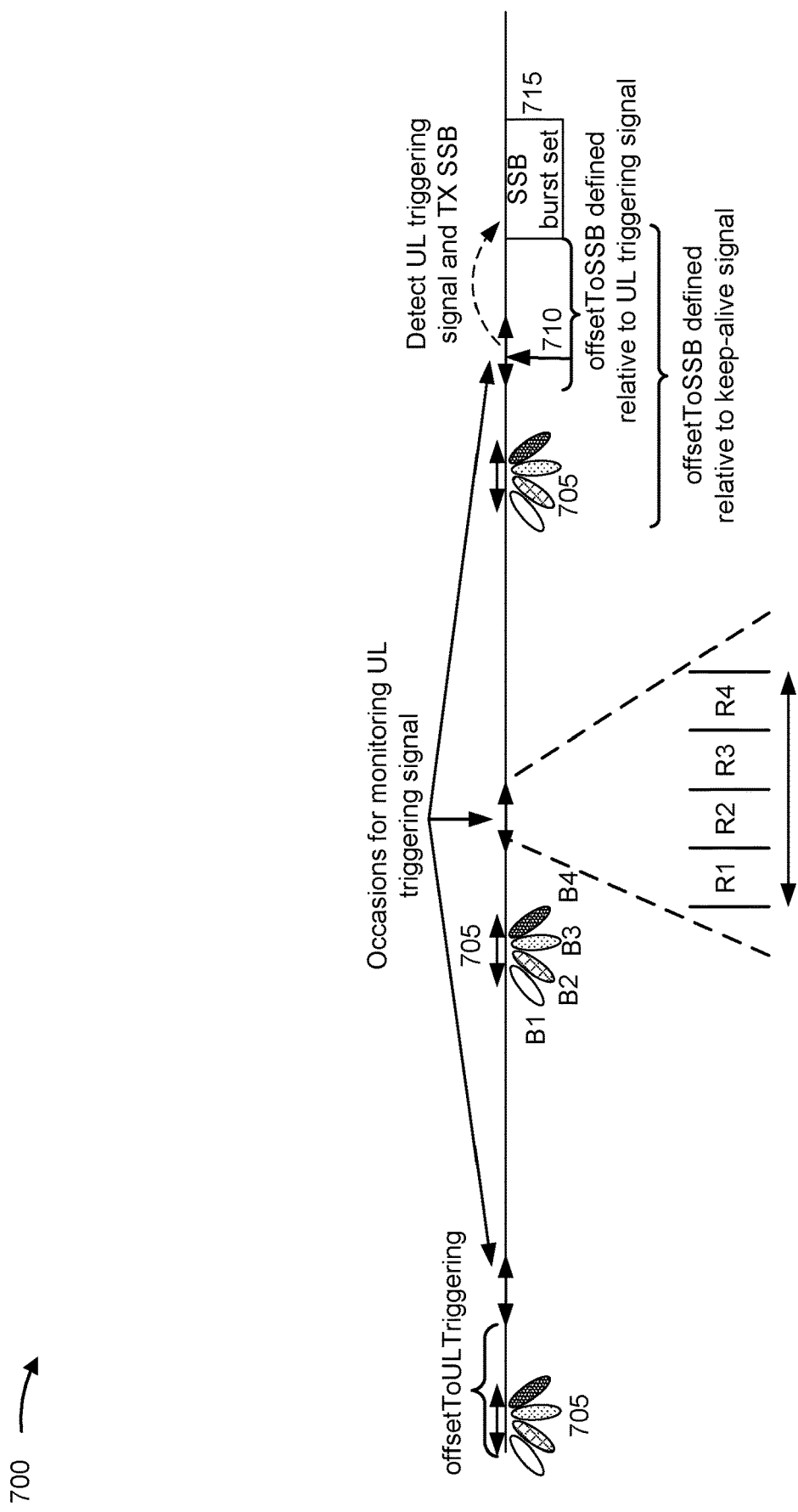

FIG. 7 is a diagram illustrating an example 700 associated with keep-alive signaling for network energy saving, in accordance with the present disclosure. As shown in FIG. 7, example 700 shows an example in which a base station transmits an SSB burst set, for a cell in an energy saving mode, in connection with receiving an uplink triggering signal from a UE.

As shown in FIG. 7, a base station may periodically transmit a keep-alive signal 705 that indicates the presence of a cell in an energy saving mode. As further shown in FIG. 7, after each transmission of the keep-alive signal 705, the base station may monitor a respective uplink triggering signal occasion offset from the keep-alive signal 705 by a time offset (offsetToULTriggering) associated with the uplink triggering signal. In some aspects, a UE may detect and receive a transmission of the keep-alive signal 705, and the UE may transmit an uplink triggering signal 710 to the base station based at least in part on receiving the keep-alive signal 705. For example, transmission of the uplink triggering signal by the UE may be offset from the keep-alive signal 705 received by the UE by the time offset (offsetToULTriggering) associated with the uplink triggering signal. The base station may detect the uplink triggering signal 710 transmitted in one of the uplink triggering signal occasions, and the uplink triggering signal may trigger the base station to transmit an SSB burst set 715.

In some aspects, the base station may transmit the keep-alive signal 705 on multiple beams. For example, as shown in FIG. 7, the base station may transmit the keep-alive signal on a first beam B1, a second beam B2, a third beam B3, and a fourth beam B4. In some aspects, a respective one or more resources for the uplink triggering signal 710 may be associated with each beam of the multiple beams on which the keep-alive signal 705 is transmitted. For example, as shown in FIG. 7, a first resource R1 (or first set of resources) may be associated with the first beam B1, a second resource R2 (or second set of resources) may be associated with the second beam B2, a third resource R3 (or third set of resources) may be associated with the third beam B3, and a fourth resource R4 (or fourth set of resources) may be associated with the fourth beam B4. In this case, the resources (R1-R4) may be time resources for transmitting the uplink triggering signal 710 (e.g., within an uplink triggering signal occasion, as shown in FIG. 7), frequency resources for transmitting the uplink triggering signal 710, and/or code or sequency resources for transmitting the uplink triggering signal 710. The UE may transmit the uplink triggering signal 710 in a resource associated with the beam on which the UE receives the keep-alive signal 705. For example, in a case in which the UE receives the keep-alive signal 705 on the first beam B1, the UE may transmit the uplink triggering signal 710 in the first resource R1 associated with the first beam B1.

In some aspects, the base station 110 may form a receive beam for receiving the uplink triggering signal 710 based at least in part on the association between the different beams (e.g., B1-B4) on which the keep-alive signal 705 is transmitted and the respective resources (e.g., R1-R4) on which the uplink triggering signal 710 may be received by the base station 110. In this case, for each beam (e.g., B1-B4) used to transmit the keep-alive signal 705, the base station 110 may monitor the respective resource(s) (e.g., R1-R4) associated with that beam, using a receive beam corresponding to that beam (e.g., a receive beam having the same beam direction as the transmit beam used to transmit the keep-alive signal). For example, during an uplink triggering signal monitoring occasion, the base station may monitor the first resource R1 using a receive beam corresponding to (e.g., having the same beam direction as) the first beam B1, the base station may monitor the second resource R2 using a receive beam corresponding to the second beam B2, the base station may monitor the third resource R3 using a receive beam corresponding to the third beam B3, and the base station may monitor the fourth resource R4 using a receive beam corresponding to the fourth beam B4.

In some aspects, the base station may transmit the SSB burst set 715, in connection with receiving the uplink triggering signal 710, at a time offset (offsetToSSB) defined relative to the keep-alive signal 705 received by the UE. In some aspects, the base station may transmit the SSB burst set 715, in connection with receiving the uplink triggering signal 710, at a time offset (offsetToSSB) defined relative to the uplink triggering signal 710. In some aspects, after transmitting the uplink triggering signal, the UE may monitor an SSB burst set occasion and receive the SSB burst set 715 transmitted by the base station based at least in part on monitoring the SSB burst set occasion. For example, the SSB burst set occasion may be offset from the keep-alive signal 705 received by the UE by the time offset (offsetToSSB), or the SSB burst set occasion may be offset from the uplink triggering signal 710 by the time offset (offsetToSSB).

In some aspects, the resource (e.g., R1, R2, R3, or R4) on which the uplink triggering signal 710 is received by the base station may be associated with the beam (e.g., B1, B2, B3, or B4) on which the UE received the keep-alive signal 705. In this case, the resource (e.g., R1, R2, R3, or R4) on which the uplink triggering signal 710 is received may provide, to the base station, an indication of the beam direction to use for communicating with the UE. In some aspects, the SSB burst set 715 transmitted by the base station may be based at least in part on the resource (e.g., R1, R2, R3, or R4) in which the uplink triggering signal 710 is received by the base station. For example, the base station may determine, based at least in part on the resource (e.g., R1, R2, R3, or R4) on which the uplink triggering signal 710 is received (e.g., and/or based at least in part on the beam direction indicated by that resource), an SSB periodicity, an offset of the SSB burst set (e.g., offsetToSSB), and/or a selection of which SSBs, from a set of possible SSBs (e.g., 64 possible SSBs in FR2) are in the SSB burst set 715.

In some aspects, the MIB in the SSBs included in the SSB burst set 715 transmitted based at least in part on receiving the uplink triggering signal 710 may include some different information (e.g., a first information set) from information (e.g., a second information set) included in the MIB of other SSBs (e.g., SSBs in an SSB burst set that is not transmitted based at least in part on receiving an uplink triggering signal). For example, some information, such as an indication of which SSBs are sent and the SSB index, may be conveyed in the keep-alive signal 705. In this case, in an SSB in the SSB burst set 715 transmitted based at least in part on receiving the uplink triggering signal 710, the bit fields in the MIB used to convey the information already conveyed in the keep-alive signal 705 may be reinterpreted or repurposed to convey other information (e.g., power saving parameters, time to exit the current power saving mode, and/or a new set of access parameters for idle UEs, among other examples) to the UE. In some aspects, in order to avoid confusion for UEs that may not correctly interpret this information, the SSBs in the SSB burst set 715 transmitted based at least in part on receiving the uplink triggering signal 710 may be non-cell-defining SSBs or off-raster SSBs.

As indicated above, FIG. 7 is provided as an example. Other examples may differ from what is described with respect to FIG. 7.

Figure 8:
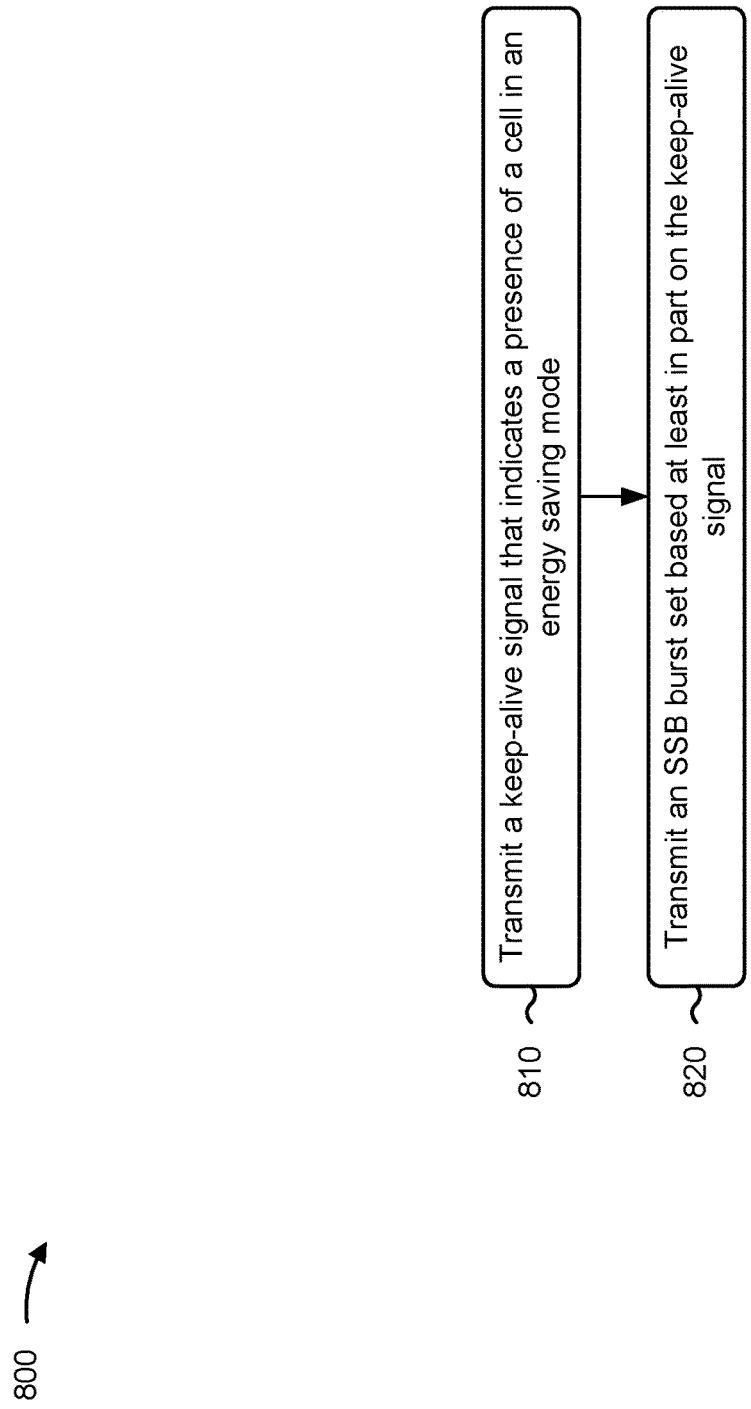
FIGS. 8-9 are diagrams illustrating example processes associated with keep-alive signaling for network energy saving, in accordance with the present disclosure.

FIG. 8 is a diagram illustrating an example process 800 performed, for example, by a base station, in accordance with the present disclosure. Example process 800 is an example where the base station (e.g., base station 110) performs operations associated with keep-alive signaling for network energy saving.

As shown in FIG. 8, in some aspects, process 800 may include transmitting a keep-alive signal that indicates a presence of a cell in an energy saving mode (block 810). For example, the base station (e.g., using communication manager 150 and/or transmission component 1004, depicted in FIG. 10) may transmit a keep-alive signal that indicates a presence of a cell in an energy saving mode, as described above.

As further shown in FIG. 8, in some aspects, process 800 may include transmitting an SSB burst set based at least in part on the keep-alive signal (block 820). For example, the base station (e.g., using communication manager 150 and/or transmission component 1004, depicted in FIG. 10) may transmit an SSB burst set based at least in part on the keep-alive signal, as described above.

Process 800 may include additional aspects, such as any single aspect or any combination of aspects described below and/or in connection with one or more other processes described elsewhere herein.

In a first aspect, a duration of the keep-alive signal spans one or more consecutive symbols.

In a second aspect, alone or in combination with the first aspect, a duration of the keep-alive signal spans multiple consecutive symbols, and transmitting the keep-alive signal includes transmitting the keep-alive signal on a first beam on a first symbol of the multiple consecutive symbols and a second beam on a second symbol of the multiple consecutive symbols.

In a third aspect, alone or in combination with one or more of the first and second aspects, a duration of the keep-alive signal spans multiple consecutive symbols and the keep-alive signal includes a same generation sequence for each of the multiple consecutive symbols.

In a fourth aspect, alone or in combination with one or more of the first through third aspects, a duration of the keep-alive signal spans multiple consecutive symbols and the keep-alive signal includes a first generation sequence mapped to a first symbol of the multiple consecutive symbols and a second generation sequence mapped to a second symbol of the multiple consecutive symbols.

In a fifth aspect, alone or in combination with one or more of the first through fourth aspects, at least one of a generation sequence for the keep-alive signal or a time offset for the keep-alive signal is based at least in part on a cell group associated with one or more cells in the energy saving mode.

In a sixth aspect, alone or in combination with one or more of the first through fifth aspects, transmitting the keep-alive signal includes periodically transmitting the keep-alive signal at a periodicity associated with the keep-alive signal.

In a seventh aspect, alone or in combination with one or more of the first through sixth aspects, transmitting the SSB burst set includes periodically transmitting the SSB burst set at a periodicity associated with the SSB burst set, and the periodicity associated with the SSB burst is based at least in part on the periodicity associated with the keep-alive signal.

In an eighth aspect, alone or in combination with one or more of the first through seventh aspects, the periodicity associated with the SSB burst set is an integer multiple of the periodicity associated with the keep-alive signal.

In a ninth aspect, alone or in combination with one or more of the first through eighth aspects, transmitting the SSB burst set includes transmitting the SSB burst set with at least a minimum time offset between the keep-alive signal and the SSB burst set.

In a tenth aspect, alone or in combination with one or more of the first through ninth aspects, process 800 includes receiving an uplink triggering signal from a UE, and transmitting the SSB burst set includes transmitting the SSB burst set in connection with receiving the uplink triggering signal.

In an eleventh aspect, alone or in combination with one or more of the first through tenth aspects, receiving the uplink triggering signal includes receiving the uplink triggering signal based at least in part on monitoring an uplink triggering signal occasion offset from the keep-alive signal by a time offset.

In a twelfth aspect, alone or in combination with one or more of the first through eleventh aspects, transmitting the SSB burst set in connection with receiving the uplink triggering signal includes transmitting the SSB burst set, in connection with receiving the uplink triggering signal, at a time offset with respect to transmitting the keep-alive signal.

In a thirteenth aspect, alone or in combination with one or more of the first through twelfth aspects, transmitting the SSB burst set in connection with receiving the uplink triggering signal includes transmitting the SSB burst set, in connection with receiving the uplink triggering signal, at a time offset with respect to receiving the uplink triggering signal.

In a fourteenth aspect, alone or in combination with one or more of the first through thirteenth aspects, transmitting the keep-alive signal includes transmitting the keep-alive signal on multiple beams, a respective one or more resources for the uplink triggering signal are associated with each beam of the multiple beams, and receiving the uplink triggering signal includes receiving the uplink triggering signal in a resource of the respective one or more resources associated with a beam, of the multiple beams, on which the keep-alive signal is received by the UE.

In a fifteenth aspect, alone or in combination with one or more of the first through fourteenth aspects, the one or more resources associated with each beam of the multiple beams include at least one of one or more time resources for the uplink triggering signal, one or more frequency resources for the uplink triggering signal, or one or more code or sequence resource for the uplink triggering signal.

In a sixteenth aspect, alone or in combination with one or more of the first through fifteenth aspects, receiving the uplink triggering signal in the resource of the respective one or more resources associated with the beam on which the keep-alive signal is received by the UE includes monitoring, for each beam of the multiple beams, the respective one or more resources associated with that beam using a respective receive beam corresponding to that beam.

In a seventeenth aspect, alone or in combination with one or more of the first through sixteenth aspects, transmitting the SSB burst set in connection with receiving the uplink triggering signal includes transmitting the SSB burst set based at least in part on the resource in which the uplink triggering signal is received.

In an eighteenth aspect, alone or in combination with one or more of the first through seventeenth aspects, transmitting the SSB burst set based at least in part on the resource on which the uplink triggering signal is received includes transmitting the SSB burst set with at least one of an SSB periodicity, an offset, or a selection of SSBs included in the SSB burst set based at least in part on the resource in which the uplink triggering signal is received.

In a nineteenth aspect, alone or in combination with one or more of the first through eighteenth aspects, SSBs in the SSB burst include a first set of information in a master information block that is different from a second set of information included in a master information block in SSBs in another SSB burst set that is transmitted not based at least in part on the keep-alive signal.

In a twentieth aspect, alone or in combination with one or more of the first through nineteenth aspects, the SSB burst includes at least one of non-cell-defining SSBs or off-raster SSBs.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
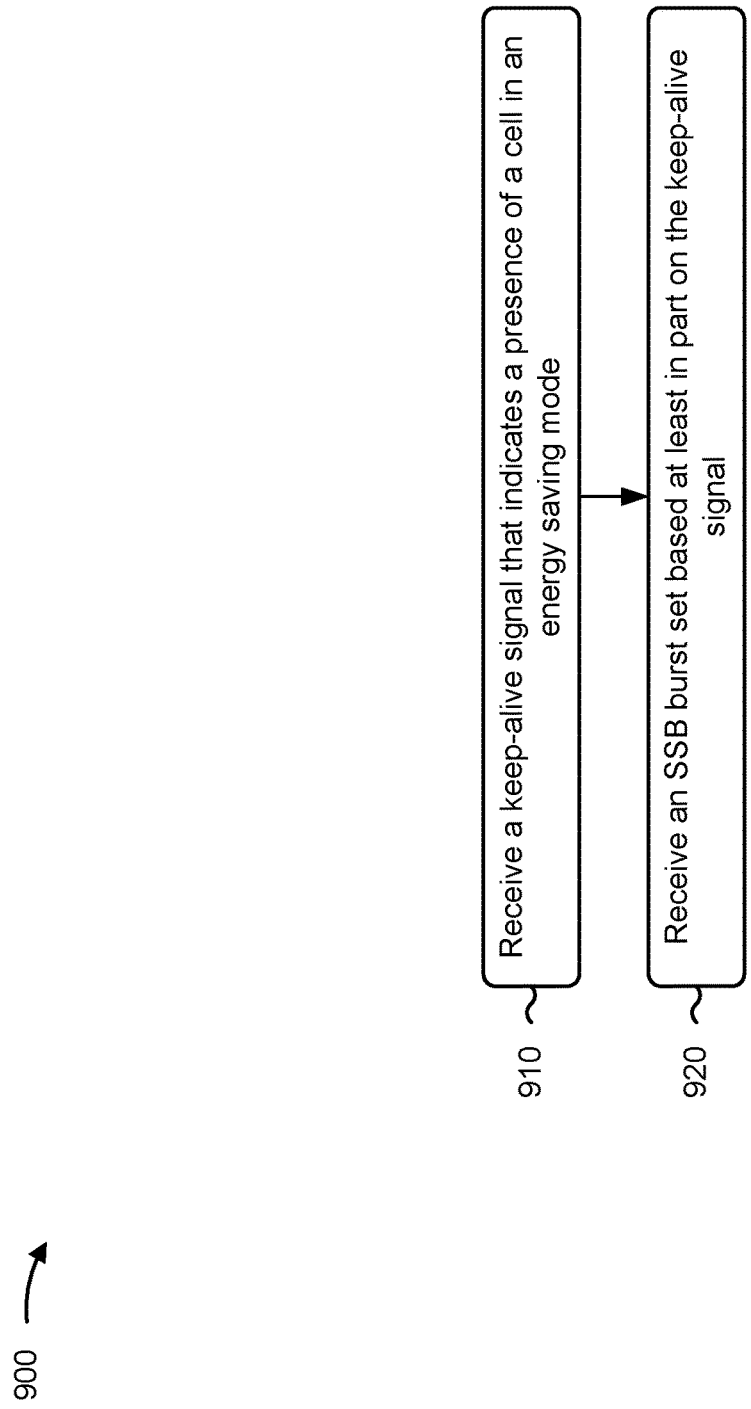

FIG. 9 is a diagram illustrating an example process 900 performed, for example, by a UE, in accordance with the present disclosure. Example process 900 is an example where the UE (e.g., UE 120) performs operations associated with keep-alive signaling for network energy saving.

As shown in FIG. 9, in some aspects, process 900 may include receiving, from a base station, a keep-alive signal that indicates a presence of a cell in an energy saving mode (block 910). For example, the UE (e.g., using communication manager 140 and/or reception component 1102, depicted in FIG. 11) may receive, from a base station, a keep-alive signal that indicates a presence of a cell in an energy saving mode, as described above.

As further shown in FIG. 9, in some aspects, process 900 may include receiving, from the base station, an SSB burst set based at least in part on the keep-alive signal (block 920). For example, the UE (e.g., using communication manager 140 and/or reception component 1102, depicted in FIG. 11) may receive, from the base station, an SSB burst set based at least in part on the keep-alive signal, as described above.

Process 900 may include additional aspects, such as any single aspect or any combination of aspects described below and/or in connection with one or more other processes described elsewhere herein.

In a first aspect, receiving the SSB burst set includes monitoring one or more candidate occasions for the SSB burst set at respective offsets from the keep-alive signal, wherein the respective offsets for the one or more candidate occasions are determined based at least in part on a periodicity associated with the keep-alive signal, a scaling factor between the periodicity associated with the keep-alive signal and a periodicity associated with the SSB burst set, and a minimum offset between the keep-alive signal and the SSB burst set, and receiving the SSB burst set in a candidate occasion of the one or more candidate occasions for the SSB burst set.

In a second aspect, alone or in combination with the first aspect, process 900 includes performing beam searching over multiple periodic transmissions of the keep-alive signal to select a receive beam for receiving the SSB burst set.

In a third aspect, alone or in combination with one or more of the first and second aspects, process 900 includes transmitting, to the base station and based at least in part on receiving the keep-alive signal, an uplink triggering signal for triggering transmission of the SSB burst set by the base station.

In a fourth aspect, alone or in combination with one or more of the first through third aspects, transmitting the uplink triggering signal includes transmitting the uplink triggering signal at a time offset with respect to receiving the keep-alive signal.

In a fifth aspect, alone or in combination with one or more of the first through fourth aspects, receiving the SSB burst set includes receiving the SSB burst set based at least in part on monitoring an SSB burst set occasion offset from the keep-alive signal by a time offset.

In a sixth aspect, alone or in combination with one or more of the first through fifth aspects, receiving the SSB burst set includes receiving the SSB burst set based at least in part on monitoring an SSB burst set occasion offset from the uplink triggering signal by a time offset.

In a seventh aspect, alone or in combination with one or more of the first through sixth aspects, transmitting the uplink triggering signal includes transmitting the uplink triggering signal in a resource associated with a beam on which the keep-alive signal is received.

In an eighth aspect, alone or in combination with one or more of the first through seventh aspects, the resource associated the beam on which the keep-alive signal is received includes at least one of a time resource for the uplink triggering signal, a frequency resources for the uplink triggering signal, or a code or sequence resource for the uplink triggering signal.

In a ninth aspect, alone or in combination with one or more of the first through eighth aspects, receiving the SSB burst set includes receiving the SSB burst set based at least in part on transmitting the uplink triggering signal, and the SSB burst set is based at least in part on the resource in which the uplink triggering signal is transmitted.

In a tenth aspect, alone or in combination with one or more of the first through ninth aspects, at least one of an SSB periodicity of the SSB burst set, an offset of the SSB burst set, or a selection of SSBs included in the SSB burst set is based at least in part on the resource in which the uplink triggering signal is transmitted.

In an eleventh aspect, alone or in combination with one or more of the first through tenth aspects, at least one of an SSB periodicity of the SSB burst set, an offset of the SSB burst set, or a selection of SSBs included in the SSB burst set is based at least in part on the resource in which the uplink triggering signal is transmitted.

In a twelfth aspect, alone or in combination with one or more of the first through eleventh aspects, SSBs in the SSB burst set include a first set of information in a master information block that is different from a second set of information included in a master information block in SSBs in another SSB burst set that is not based at least in part on the keep-alive signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
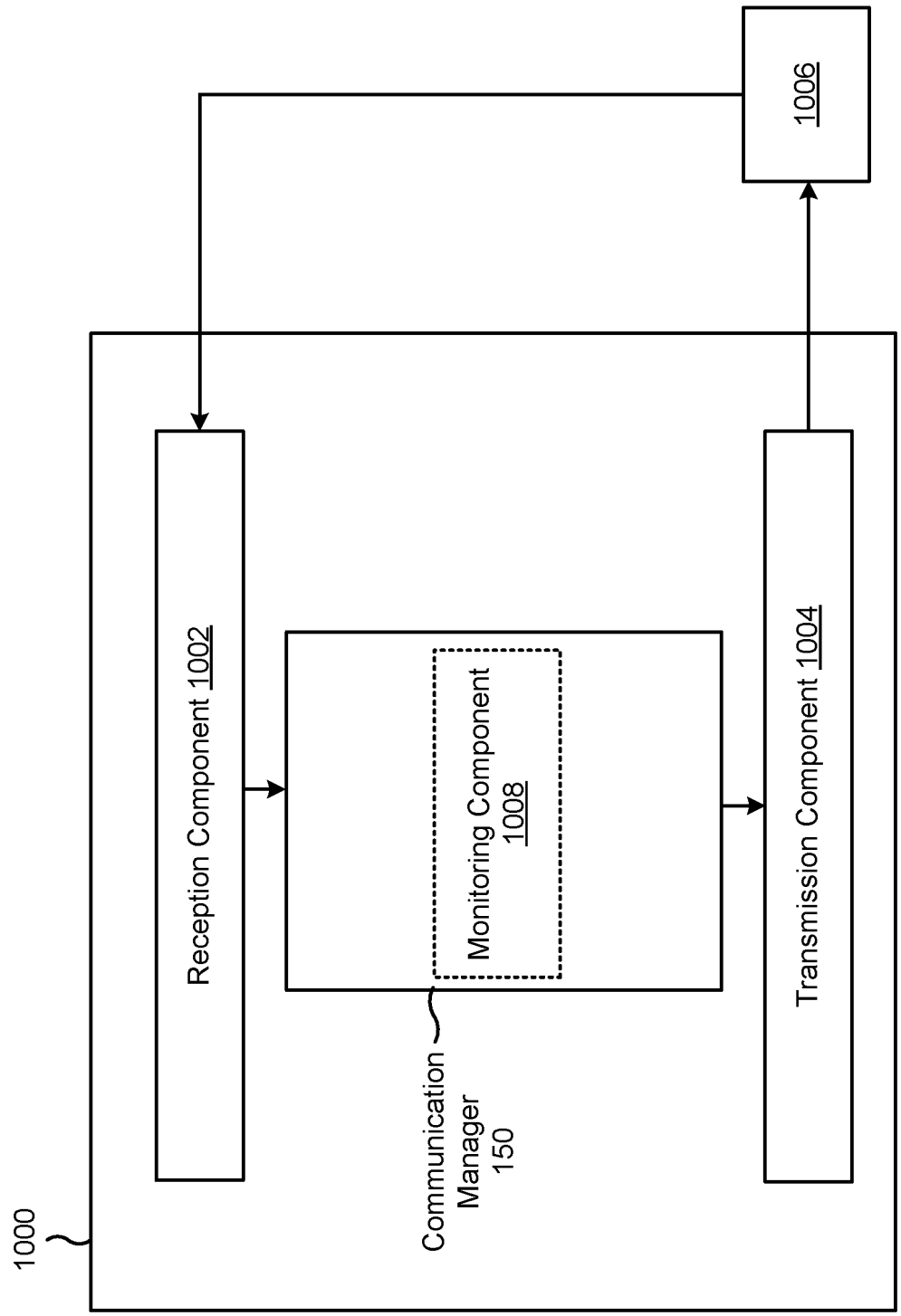
FIGS. 10-11 are diagrams of example apparatuses for wireless communication, in accordance with the present disclosure.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a monitoring component 1008, among other examples.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit a keep-alive signal that indicates a presence of a cell in an energy saving mode. The transmission component 1004 may transmit an SSB burst set based at least in part on the keep-alive signal.

The reception component 1002 may receive an uplink triggering signal from a UE, wherein transmitting the SSB burst set comprises transmitting the SSB burst set in connection with receiving the uplink triggering signal.

The monitoring component 1008 may monitor an uplink triggering signal occasion offset from the keep-alive signal by a time offset.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
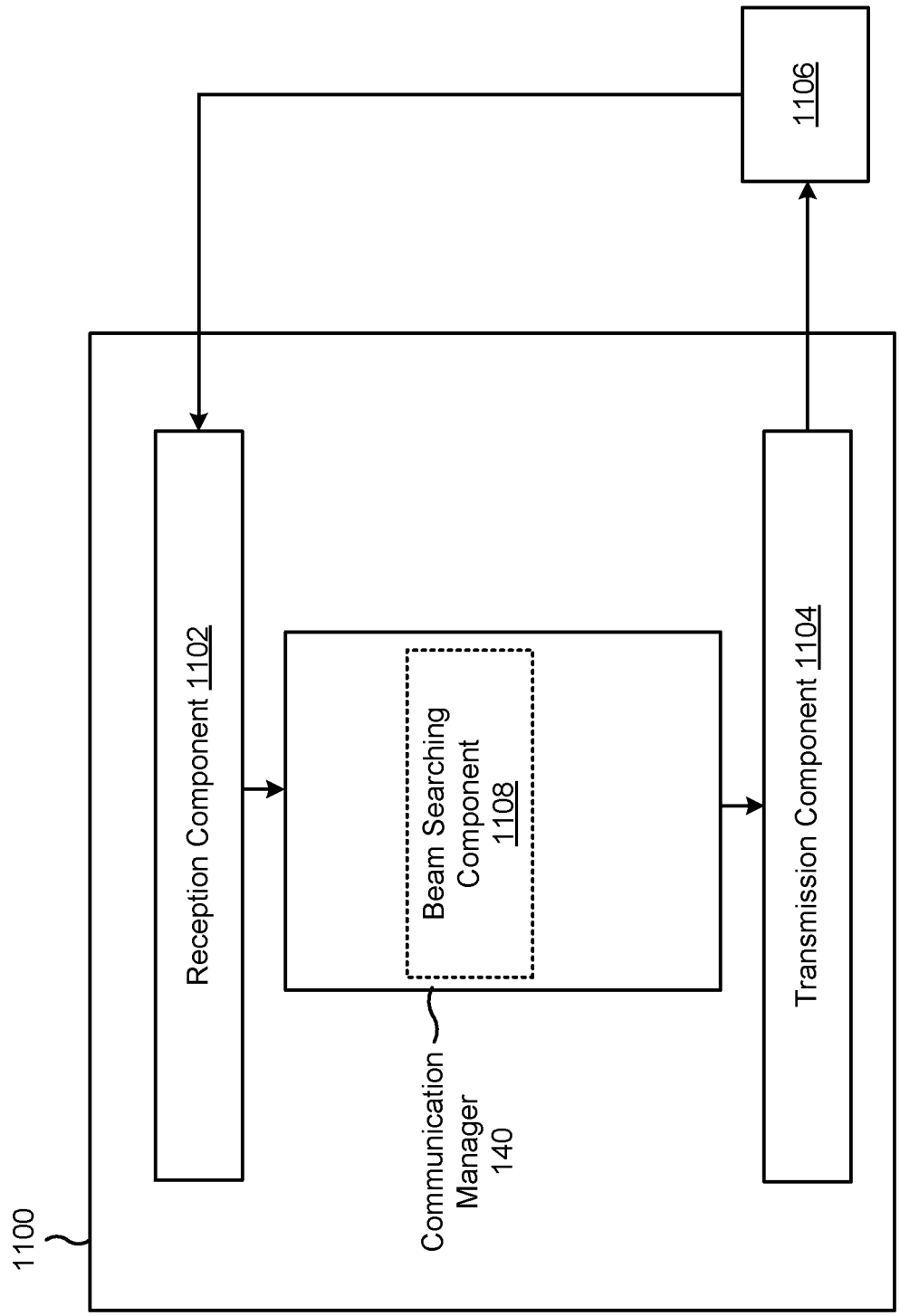

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a beam searching component 1108, among other examples.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, a keep-alive signal that indicates a presence of a cell in an energy saving mode. The reception component 1102 may receive, from the base station, an SSB burst set based at least in part on the keep-alive signal.

The beam searching component 1108 may perform beam searching over multiple periodic transmissions of the keep-alive signal to select a receive beam for receiving the SSB burst set.

The transmission component 1104 may transmit, to the base station and based at least in part on receiving the keep-alive signal, an uplink triggering signal for triggering transmission of the SSB burst set by the base station.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a base station, comprising: transmitting a keep-alive signal that indicates a presence of a cell in an energy saving mode; and transmitting a synchronization signal block (SSB) burst set based at least in part on the keep-alive signal.

Aspect 2: The method of Aspect 1, wherein a duration of the keep-alive signal spans one or more consecutive symbols.

Aspect 3: The method of any of Aspects 1-2, wherein a duration of the keep-alive signal spans multiple consecutive symbols, and wherein transmitting the keep-alive signal comprises: transmitting the keep-alive signal on a first beam on a first symbol of the multiple consecutive symbols and a second beam on a second symbol of the multiple consecutive symbols.

Aspect 4: The method of any of Aspects 1-3, wherein a duration of the keep-alive signal spans multiple consecutive symbols and the keep-alive signal includes a same generation sequence for each of the multiple consecutive symbols.

Aspect 5: The method of any of Aspects 1-3, wherein a duration of the keep-alive signal spans multiple consecutive symbols and the keep-alive signal includes a first generation sequence mapped to a first symbol of the multiple consecutive symbols and a second generation sequence mapped to a second symbol of the multiple consecutive symbols.

Aspect 6: The method of any of Aspects 1-5, wherein at least one of a generation sequence for the keep-alive signal or a time offset for the keep-alive signal is based at least in part on a cell group associated with one or more cells in the energy saving mode.

Aspect 7: The method of any of Aspects 1-6, wherein transmitting the keep-alive signal comprises: periodically transmitting the keep-alive signal at a periodicity associated with the keep-alive signal.

Aspect 8: The method of Aspect 7, wherein transmitting the SSB burst set comprises: periodically transmitting the SSB burst set at a periodicity associated with the SSB burst set, wherein the periodicity associated with the SSB burst is based at least in part on the periodicity associated with the keep-alive signal.

Aspect 9: The method of Aspect 8, wherein the periodicity associated with the SSB burst set is an integer multiple of the periodicity associated with the keep-alive signal.

Aspect 10: The method of any of Aspects 8-9, wherein transmitting the SSB burst set further comprises: transmitting the SSB burst set with at least a minimum time offset between the keep-alive signal and the SSB burst set.

Aspect 11: The method of any of Aspects 1-7, further comprising: receiving an uplink triggering signal from a user equipment (UE), wherein transmitting the SSB burst set comprises transmitting the SSB burst set in connection with receiving the uplink triggering signal.

Aspect 12: The method of Aspect 11, wherein receiving the uplink triggering signal comprises: receiving the uplink triggering signal based at least in part on monitoring an uplink triggering signal occasion offset from the keep-alive signal by a time offset.

Aspect 13: The method of any of Aspects 11-12, wherein transmitting the SSB burst set in connection with receiving the uplink triggering signal comprises: transmitting the SSB burst set, in connection with receiving the uplink triggering signal, at a time offset with respect to transmitting the keep-alive signal.

Aspect 14: The method of any of Aspects 11-12, wherein transmitting the SSB burst set in connection with receiving the uplink triggering signal comprises: transmitting the SSB burst set, in connection with receiving the uplink triggering signal, at a time offset with respect to receiving the uplink triggering signal.

Aspect 15: The method of any of Aspects 11-14, wherein transmitting the keep-alive signal comprises transmitting the keep-alive signal on multiple beams, wherein a respective one or more resources for the uplink triggering signal are associated with each beam of the multiple beams, and wherein receiving the uplink triggering signal comprises: receiving the uplink triggering signal in a resource of the respective one or more resources associated with a beam, of the multiple beams, on which the keep-alive signal is received by the UE.

Aspect 16: The method of Aspect 15, wherein the one or more resources associated with each beam of the multiple beams comprise at least one of: one or more time resources for the uplink triggering signal, one or more frequency resources for the uplink triggering signal, or one or more code or sequence resource for the uplink triggering signal.

Aspect 17: The method of any of Aspects 15-16, wherein receiving the uplink triggering signal in the resource of the respective one or more resources associated with the beam on which the keep-alive signal is received by the UE comprises: monitoring, for each beam of the multiple beams, the respective one or more resources associated with that beam using a respective receive beam corresponding to that beam.

Aspect 18: The method of any of Aspects 15-17, wherein transmitting the SSB burst set in connection with receiving the uplink triggering signal comprises: transmitting the SSB burst set based at least in part on the resource in which the uplink triggering signal is received.

Aspect 19: The method of Aspects 18, wherein transmitting the SSB burst set based at least in part on the resource on which the uplink triggering signal is received comprises: transmitting the SSB burst set with at least one of an SSB periodicity, an offset, or a selection of SSBs included in the SSB burst set based at least in part on the resource in which the uplink triggering signal is received.

Aspect 20: The method of any of Aspects 1-19, wherein SSBs in the SSB burst include a first set of information in a master information block that is different from a second set of information included in a master information block in SSBs in another SSB burst set that is transmitted not based at least in part on the keep-alive signal.

Aspect 21: The method of Aspects 20, wherein the SSB burst includes at least one of non-cell-defining SSBs or off-raster SSBs.

Aspect 22: A method of wireless communication performed by a user equipment (UE), comprising: receiving, from a base station, a keep-alive signal that indicates a presence of a cell in an energy saving mode; and receiving, from the base station, a synchronization signal block (SSB) burst set based at least in part on the keep-alive signal.

Aspect 23: The method of Aspect 22, wherein receiving the SSB burst set comprises: monitoring one or more candidate occasions for the SSB burst set at respective offsets from the keep-alive signal, wherein the respective offsets for the one or more candidate occasions are determined based at least in part on a periodicity associated with the keep-alive signal, a scaling factor between the periodicity associated with the keep-alive signal and a periodicity associated with the SSB burst set, and a minimum offset between the keep-alive signal and the SSB burst set; and receiving the SSB burst set in a candidate occasion of the one or more candidate occasions for the SSB burst set.

Aspect 24: The method of Aspect 23, further comprising: performing beam searching over multiple periodic transmissions of the keep-alive signal to select a receive beam for receiving the SSB burst set.

Aspect 25: The method of Aspect 22, further comprising: transmitting, to the base station and based at least in part on receiving the keep-alive signal, an uplink triggering signal for triggering transmission of the SSB burst set by the base station.

Aspect 26: The method of Aspect 25, wherein transmitting the uplink triggering signal comprises: transmitting the uplink triggering signal at a time offset with respect to receiving the keep-alive signal.

Aspect 27: The method of any of Aspects 25-26, wherein receiving the SSB burst set comprises: receiving the SSB burst set based at least in part on monitoring an SSB burst set occasion offset from the keep-alive signal by a time offset.

Aspect 28: The method of any of Aspects 25-26, wherein receiving the SSB burst set comprises: receiving the SSB burst set based at least in part on monitoring an SSB burst set occasion offset from the uplink triggering signal by a time offset.

Aspect 29: The method of any of Aspects 25-26, wherein transmitting the uplink triggering signal comprises: transmitting the uplink triggering signal in a resource associated with a beam on which the keep-alive signal is received.

Aspect 30: The method of Aspect 29, wherein the resource associated the beam on which the keep-alive signal is received comprises at least one of: a time resource for the uplink triggering signal, a frequency resources for the uplink triggering signal, or a code or sequence resource for the uplink triggering signal.

Aspect 31: The method of any of Aspects 29-30, wherein receiving the SSB burst set comprises: receiving the SSB burst set based at least in part on transmitting the uplink triggering signal, wherein the SSB burst set is based at least in part on the resource in which the uplink triggering signal is transmitted.

Aspect 32: The method of Aspect 31, wherein at least one of an SSB periodicity of the SSB burst set, an offset of the SSB burst set, or a selection of SSBs included in the SSB burst set is based at least in part on the resource in which the uplink triggering signal is transmitted.

Aspect 33: The method of any of Aspects 22-32, wherein at least one of an SSB periodicity of the SSB burst set, an offset of the SSB burst set, or a selection of SSBs included in the SSB burst set is based at least in part on the resource in which the uplink triggering signal is transmitted.

Aspect 34: The method of Aspect 33, wherein SSBs in the SSB burst set include a first set of information in a master information block that is different from a second set of information included in a master information block in SSBs in another SSB burst set that is not based at least in part on the keep-alive signal.

Aspect 35: An apparatus for wireless communication at a device, comprising a processor; memory coupled with the processor; and instructions stored in the memory and executable by the processor to cause the apparatus to perform the method of one or more of Aspects 1-21.

Aspect 36: An apparatus for wireless communication at a device, comprising a processor; memory coupled with the processor; and instructions stored in the memory and executable by the processor to cause the apparatus to perform the method of one or more of Aspects 22-34.

Aspect 37: A device for wireless communication, comprising a memory and one or more processors coupled to the memory, the one or more processors configured to perform the method of one or more of Aspects 1-21.

Aspect 38: A device for wireless communication, comprising a memory and one or more processors coupled to the memory, the one or more processors configured to perform the method of one or more of Aspects 22-34.

Aspect 39: An apparatus for wireless communication, comprising at least one means for performing the method of one or more of Aspects 1-21.

Aspect 40: An apparatus for wireless communication, comprising at least one means for performing the method of one or more of Aspects 22-34.

Aspect 41: A non-transitory computer-readable medium storing code for wireless communication, the code comprising instructions executable by a processor to perform the method of one or more of Aspects 1-21.

Aspect 42: A non-transitory computer-readable medium storing code for wireless communication, the code comprising instructions executable by a processor to perform the method of one or more of Aspects 22-34.

Aspect 43: A non-transitory computer-readable medium storing a set of instructions for wireless communication, the set of instructions comprising one or more instructions that, when executed by one or more processors of a device, cause the device to perform the method of one or more of Aspects 1-21.

Aspect 44: A non-transitory computer-readable medium storing a set of instructions for wireless communication, the set of instructions comprising one or more instructions that, when executed by one or more processors of a device, cause the device to perform the method of one or more of Aspects 22-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station for wireless communication, comprising:
   one or more memories; and
   one or more processors, coupled to the one or more memories, configured to:
      transmit a keep-alive signal that indicates a presence of a cell in an energy saving mode; and
      transmit a synchronization signal block (SSB) burst set based at least in part on the keep-alive signal,
         wherein the one or more processors, to transmit the SSB burst set, are configured to:
            periodically transmit the SSB burst set at a periodicity that is an integer multiple of a periodicity associated with the keep-alive signal, or
            transmit the SSB burst set, in connection with receiving an uplink triggering signal, at a time offset with respect to transmitting the keep-alive signal or at a time offset with respect to receiving the uplink triggering signal.

2. The base station of claim 1, wherein a duration of the keep-alive signal spans multiple consecutive symbols, and wherein the one or more processors, to transmit the keep-alive signal, are configured to:
   transmit the keep-alive signal on a first beam on a first symbol of the multiple consecutive symbols and a second beam on a second symbol of the multiple consecutive symbols.

3. The base station of claim 1, wherein a duration of the keep-alive signal spans multiple consecutive symbols and the keep-alive signal includes a same generation sequence for each of the multiple consecutive symbols.

4. The base station of claim 1, wherein a duration of the keep-alive signal spans multiple consecutive symbols and the keep-alive signal includes a first generation sequence mapped to a first symbol of the multiple consecutive symbols and a second generation sequence mapped to a second symbol of the multiple consecutive symbols.

5. The base station of claim 1, wherein at least one of a generation sequence for the keep-alive signal or a time offset for the keep-alive signal is based at least in part on a cell group associated with one or more cells in the energy saving mode.

6. The base station of claim 1, wherein the one or more processors, to transmit the keep-alive signal, are configured to periodically transmit the keep-alive signal at a periodicity associated with the keep-alive signal.

7. The base station of claim 6, wherein the one or more processors, to transmit the SSB burst set, are further configured to:
transmit the SSB burst set with at least a minimum time offset between the keep-alive signal and the SSB burst set.

8. The base station of claim 1, wherein the one or more processors are further configured to receive the uplink triggering signal from a user equipment (UE), and wherein the one or more processors, to transmit the SSB burst set, are configured to:
transmit the SSB burst set in connection with receiving the uplink triggering signal.

9. The base station of claim 8, wherein the one or more processors, to receive the uplink triggering signal, are configured to receive the uplink triggering signal based at least in part on monitoring an uplink triggering signal occasion offset from the keep-alive signal by a time offset.

10. The base station of claim 8, wherein the one or more processors, to transmit the keep-alive signal, are configured to transmit the keep-alive signal on multiple beams, wherein a respective one or more resources for the uplink triggering signal are associated with each beam of the multiple beams, and wherein the one or more processors, to receive the uplink triggering signal, are configured to:
receive the uplink triggering signal in a resource of the respective one or more resources associated with a beam, of the multiple beams, on which the keep-alive signal is received by the UE.

11. The base station of claim 10, wherein the one or more resources associated with each beam of the multiple beams comprise at least one of:
one or more time resources for the uplink triggering signal,
one or more frequency resources for the uplink triggering signal, or
one or more code or sequence resource for the uplink triggering signal.

12. The base station of claim 10, wherein the one or more processors, to receive the uplink triggering signal in the resource of the respective one or more resources associated with the beam on which the keep-alive signal is received, are configured to:
monitor, for each beam of the multiple beams, the respective one or more resources associated with that beam using a respective receive beam corresponding to that beam.

13. The base station of claim 10, wherein the one or more processors, to transmit the SSB burst set in connection with receiving the uplink triggering signal, are configured to:
transmit the SSB burst set with at least one of an SSB periodicity, an offset, or a selection of SSBs included in the SSB burst set based at least in part on the resource in which the uplink triggering signal is received.

14. The base station of claim 1, wherein SSBs in the SSB burst set include a first set of information in a master information block that is different from a second set of information included in a master information block in SSBs in another SSB burst set that is transmitted not based at least in part on the keep-alive signal, and wherein the SSB burst set includes at least one of non-cell-defining SSBs or off-raster SSBs.

15. A user equipment (UE) for wireless communication, comprising:
one or more memories; and
one or more processors, coupled to the one or more memories, configured to:
receive, from a base station, a keep-alive signal that indicates a presence of a cell in an energy saving mode; and
receive, from the base station, a synchronization signal block (SSB) burst set based at least in part on the keep-alive signal,
wherein the one or more processors, to receive the SSB burst set, are configured to:
receive the SSB burst set in a candidate occasion of one or more candidate occasions for the SSB burst set at respective offsets from the keep-alive signal, wherein the respective offsets for the one or more candidate occasions are determined based at least in part on a periodicity associated with the keep-alive signal, a scaling factor between the periodicity associated with the keep-alive signal and a periodicity associated with the SSB burst set, and a minimum offset between the keep-alive signal and the SSB burst set, or
receive the SSB burst set based at least in part on monitoring an SSB burst set occasion offset from the keep-alive signal or an uplink triggering signal by a time offset.

16. The UE of claim 15, wherein the one or more processors, to receive the SSB burst set, are configured to:
monitor the one or more candidate occasions for the SSB burst set at the respective offsets from the keep-alive signal.

17. The UE of claim 16, wherein the one or more processors are further configured to:
perform beam searching over multiple periodic transmissions of the keep-alive signal to select a receive beam for receiving the SSB burst set.

18. The UE of claim 15, wherein the one or more processors are further configured to:
transmit, to the base station and based at least in part on receiving the keep-alive signal, the uplink triggering signal for triggering transmission of the SSB burst set by the base station.

19. The UE of claim 18, wherein the one or more processors, to transmit the uplink triggering signal, are configured to transmit the uplink triggering signal at a time offset with respect to receiving the keep-alive signal.

20. The UE of claim 18, wherein the one or more processors, to transmit the uplink triggering signal, are configured to:
transmit the uplink triggering signal in a resource associated with a beam on which the keep-alive signal is received.

21. A method of wireless communication performed by a base station, comprising:
transmitting a keep-alive signal that indicates a presence of a cell in an energy saving mode; and
transmitting a synchronization signal block (SSB) burst set based at least in part on the keep-alive signal,
wherein transmitting the SSB burst set comprises:

periodically transmitting the SSB burst set at a periodicity that is an integer multiple of a periodicity associated with the keep-alive signal, or transmitting the SSB burst set, in connection with receiving an uplink triggering signal, at a time offset with respect to transmitting the keep-alive signal or at a time offset with respect to receiving the uplink triggering signal.

22. The method of claim 21, wherein transmitting the keep-alive signal comprises periodically transmitting the keep-alive signal at the periodicity associated with the keep-alive signal.

23. The method of claim 21, further comprising:
receiving the uplink triggering signal from a user equipment (UE), wherein transmitting the SSB burst set comprises transmitting the SSB burst set in connection with receiving the uplink triggering signal.

24. The method of claim 23, wherein receiving the uplink triggering signal comprises:
receiving the uplink triggering signal based at least in part on monitoring an uplink triggering signal occasion offset from the keep-alive signal by a time offset.

25. The method of claim 23, wherein transmitting the keep-alive signal comprises transmitting the keep-alive signal on multiple beams, wherein a respective one or more resources for the uplink triggering signal are associated with each beam of the multiple beams, and wherein receiving the uplink triggering signal comprises:
receiving the uplink triggering signal in a resource of the respective one or more resources associated with a beam, of the multiple beams, on which the keep-alive signal is received by the UE.

26. The method of claim 25, wherein transmitting the SSB burst set in connection with receiving the uplink triggering comprises:
transmitting the SSB burst set with at least one of an SSB periodicity, an offset, or a selection of SSBs included in the SSB burst set based at least in part on the resource in which the uplink triggering signal is received.

27. A method of wireless communication performed by a user equipment (UE), comprising:
receiving, from a base station, a keep-alive signal that indicates a presence of a cell in an energy saving mode; and
receiving, from the base station, a synchronization signal block (SSB) burst set based at least in part on the keep-alive signal,
wherein receiving the SSB burst set comprises:
receiving the SSB burst set in a candidate occasion of one or more candidate occasions for the SSB burst set at respective offsets from the keep-alive signal, wherein the respective offsets for the one or more candidate occasions are determined based at least in part on a periodicity associated with the keep-alive signal, a scaling factor between the periodicity associated with the keep-alive signal and a periodicity associated with the SSB burst set, and a minimum offset between the keep-alive signal and the SSB burst set, or
receiving the SSB burst set based at least in part on monitoring an SSB burst set occasion offset from the keep-alive signal or an uplink triggering signal by a time offset.

28. The method of claim 27, wherein receiving the SSB burst set comprises:
monitoring the one or more candidate occasions for the SSB burst set at the respective offsets from the keep-alive signal.

29. The method of claim 27, further comprising:
transmitting, to the base station and based at least in part on receiving the keep-alive signal, the uplink triggering signal for triggering transmission of the SSB burst set by the base station.

30. The method of claim 29, wherein transmitting the uplink triggering signal comprises:
transmitting the uplink triggering signal in a resource associated with a beam on which the keep-alive signal is received.

* * * * *